(12) United States Patent
Jeon et al.

(10) Patent No.: US 11,983,136 B2
(45) Date of Patent: May 14, 2024

(54) PCIE DEVICE AND OPERATING METHOD THEREOF

(71) Applicants: Yong Tae Jeon, Icheon (KR); Sang Hyun Yoon, Icheon (KR); Se Hyeon Han, Icheon (KR)

(72) Inventors: Yong Tae Jeon, Icheon (KR); Sang Hyun Yoon, Icheon (KR); Se Hyeon Han, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/504,884

(22) Filed: Oct. 19, 2021

(65) Prior Publication Data

US 2022/0327081 A1 Oct. 13, 2022

(30) Foreign Application Priority Data

Apr. 13, 2021 (KR) .......................... 10-2021-0048073

(51) Int. Cl.
*G06F 13/20* (2006.01)
*G06F 1/08* (2006.01)
*G06F 13/364* (2006.01)
*G06F 13/40* (2006.01)
*G06F 13/42* (2006.01)

(52) U.S. Cl.
CPC ............ *G06F 13/4221* (2013.01); *G06F 1/08* (2013.01); *G06F 13/364* (2013.01); *G06F 13/4045* (2013.01); *G06F 2213/0026* (2013.01)

(58) Field of Classification Search
None
See application file for complete search history.

(56) References Cited

U.S. PATENT DOCUMENTS

| 6,647,434 B1 * | 11/2003 | Kamepalli ............ G06F 13/387 |
| | | 710/10 |
| 7,979,592 B1 | 7/2011 | Pettey et al. |
| 8,503,468 B2 | 8/2013 | Akyol et al. |
| 10,635,499 B2 | 4/2020 | Huynh |

(Continued)

FOREIGN PATENT DOCUMENTS

| CN | 108028813 A | 5/2018 |
| JP | 2010016819 A | 1/2010 |

(Continued)

OTHER PUBLICATIONS

PCIe Express, PCI Express Base Specification 3.0, Nov. 10, 2010, pp. 1-4, 97-122 (Year: 2010).*

(Continued)

*Primary Examiner* — Henry Tsai
*Assistant Examiner* — Dean Phan

(57) ABSTRACT

A Peripheral Component Interconnect Express (PCIe) device performing communication with a host through a PCIe link includes a first physical function, a plurality of second physical functions, and a function mode controller. The first physical function manages the PCIe link and receives function mode control information from the host. Each of the plurality of second physical functions may be enabled or disabled according to a respective operation mode. Based on the function mode control information, the function mode controller sets the operation modes of the plurality of second physical functions to one of an active mode and an inactive mode.

18 Claims, 12 Drawing Sheets

(56) References Cited

U.S. PATENT DOCUMENTS

| | | |
|---|---|---|
| 2010/0115174 A1 | 5/2010 | Akyol et al. |
| 2011/0106981 A1 | 5/2011 | Watkins et al. |
| 2013/0339955 A1 | 12/2013 | Prawer et al. |
| 2017/0277573 A1 | 9/2017 | Huynh |
| 2018/0239737 A1 | 8/2018 | Cha et al. |
| 2018/0367518 A1 | 12/2018 | Singh et al. |
| 2019/0042350 A1* | 2/2019 | Nadathur ............ G06F 11/0721 |
| 2019/0042741 A1 | 2/2019 | Abodunrin et al. |
| 2020/0004703 A1 | 1/2020 | Sankaran et al. |
| 2020/0278935 A1 | 9/2020 | Borikar et al. |
| 2020/0409732 A1 | 12/2020 | Kovacevic |
| 2021/0200703 A1* | 7/2021 | Simionescu ............ G06F 13/28 |
| 2021/0247935 A1* | 8/2021 | Beygi ..................... G06F 3/067 |
| 2022/0188073 A1 | 6/2022 | Bowman et al. |
| 2022/0300442 A1 | 9/2022 | Jeon et al. |
| 2022/0300448 A1 | 9/2022 | Jeon |
| 2022/0327080 A1 | 10/2022 | Jeon et al. |
| 2022/0327081 A1 | 10/2022 | Jeon et al. |
| 2022/0327082 A1 | 10/2022 | Jeon et al. |
| 2022/0327228 A1 | 10/2022 | Jeon et al. |

FOREIGN PATENT DOCUMENTS

| | | |
|---|---|---|
| KR | 1020130034036 A | 4/2013 |
| KR | 101704776 B1 | 2/2017 |
| KR | 1020170013713 A | 2/2017 |
| KR | 1020170051475 A | 5/2017 |
| KR | 1020170057237 A | 5/2017 |
| KR | 1020210024195 A | 3/2021 |

OTHER PUBLICATIONS

"PCI Express® Base Specification Revision 4.0 Version 1.0", PCI Express, Sep. 27, 2017.
Office Action dated Mar. 30, 2023 for U.S. Appl. No. 17/504,351.
Office Action dated Apr. 6, 2023 for U.S. Appl. No. 17/506,610.
Final Office Action dated Sep. 14, 2023 for U.S. Appl. No. 17/504,351.
Office Action dated Jan. 18, 2024 for the U.S. Appl. No. 17/504,346.
Notice of Allowance dated Mar. 7, 2024 for U.S. Appl. No. 17/504,351.
"Virtual Function Number Assignment", An IP.com Prior Art Database Technical Disclosure, Jul. 11, 2008, URL: https://priorart.ip.com/IPCOM/000172526.

* cited by examiner

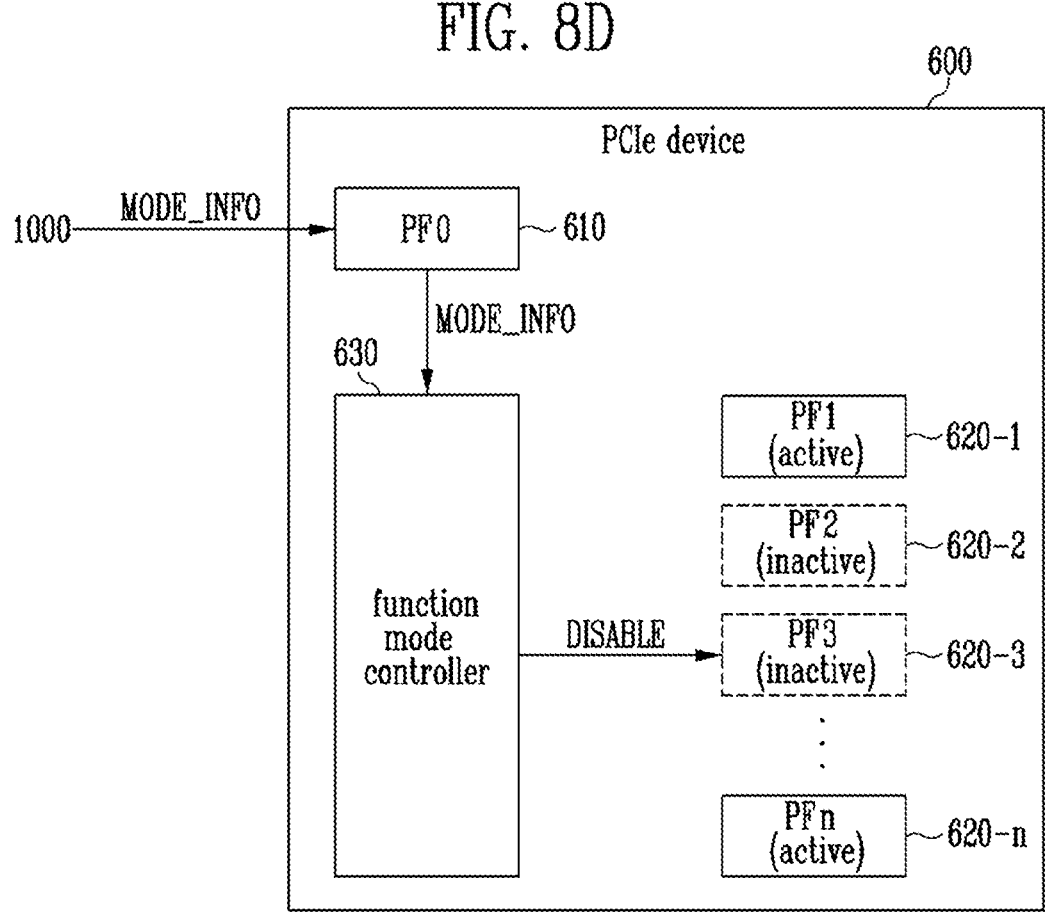

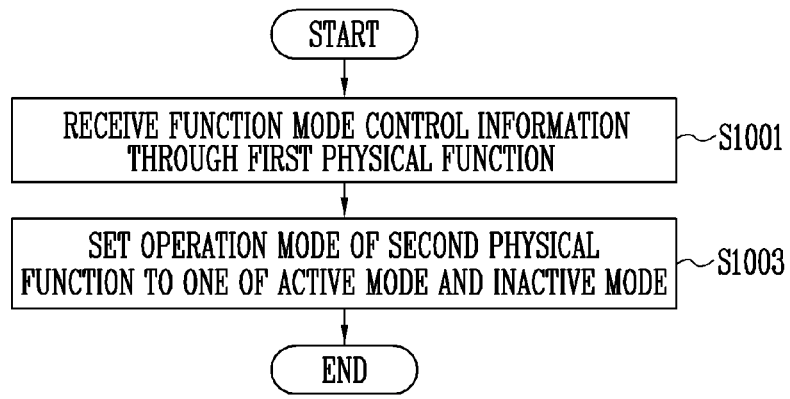
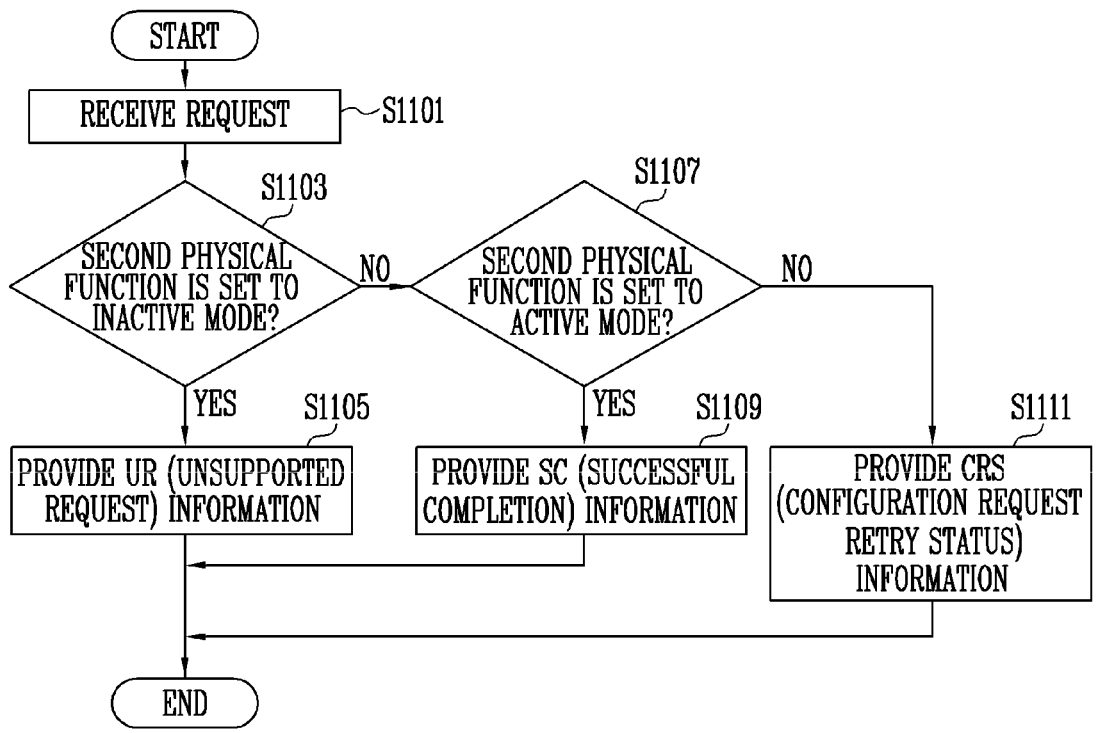

PCIE DEVICE AND OPERATING METHOD THEREOF

CROSS-REFERENCE TO RELATED APPLICATION

The present application claims priority under 35 U.S.C. § 119(a) to Korean patent application number 10-2021-0048073, filed on Apr. 13, 2021, which is incorporated herein by reference in its entirety.

BACKGROUND

Field of Invention

The present disclosure relates to an electronic device, and more particularly, to a Peripheral Component Interconnect Express (PCIe) device and an operating method thereof.

Description of Related Art

A Peripheral Component Interconnect Express (PCIe) device may define a bus protocol which is used to connect input/output devices to a host device. PCI Express (PCIe) has the concept of programming defined by the PCI standards and includes a physical communication layer defined as a high-speed serial interface.

A storage device may store data in response to control of a host device such as a computer or a smartphone. The storage device may include a memory device which stores data and a memory controller which controls the memory device. Memory devices may be divided into volatile memory devices and non-volatile memory devices.

A volatile memory device may retain data as long as power is being supplied, and may lose the stored data in the absence of power supply. Types of volatile memory devices may include Static Random Access Memory (SRAM), Dynamic Random Access Memory (DRAM), and the like.

A non-volatile memory device may not lose data even in the absence of power supply. Types of non-volatile memory devices may include Read Only Memory (ROM), Programmable ROM (PROM), Electrically Programmable ROM (EPROM), Electrically Erasable and Programmable ROM (EEPROM) and flash memory.

SUMMARY

Various embodiments are directed to a PCIe device capable of reducing operation cost of a computing system including the PCIe device, and an operating method thereof.

According to an embodiment, a Peripheral Component Interconnect Express (PCIe) device may include a first physical function managing a PCIe link and receiving function mode control information from the host, a plurality of second physical functions respectively enabled or disabled according to respectively operation modes, and a function mode controller setting the operation modes of the plurality of second physical functions based on the function mode control information, each of the operation modes being set to one of an active mode and an inactive mode.

According to an embodiment, a method of operating a Peripheral Component Interconnect Express (PCIe) device including a first physical function and a plurality of second physical functions, the first physical function managing a PCIe link coupled to a host, may include receiving function mode control information from the host through the first physical function, and setting an operation mode of each of the plurality of second physical functions based on the function mode control information, each operation mode being respectively set to one of an active mode and an inactive mode.

BRIEF DESCRIPTION OF THE DRAWINGS

FIG. 8D illustrates setting an operation mode of a physical function to an active mode in a general operation state according to an embodiment of the present disclosure;

FIG. 10 illustrates a process for operating a PCIe device according to an embodiment of the present disclosure;

FIG. 11 illustrates a process for providing PCIe device completion information according to an embodiment of the present disclosure;

DETAILED DESCRIPTION

Specific structural or functional descriptions of examples of embodiments in accordance with concepts which are disclosed in this specification are illustrated only to describe the examples of embodiments in accordance with the concepts and the examples of embodiments in accordance with the concepts may be carried out by various forms but the descriptions are not limited to the examples of embodiments described in this specification.

Figure 1:
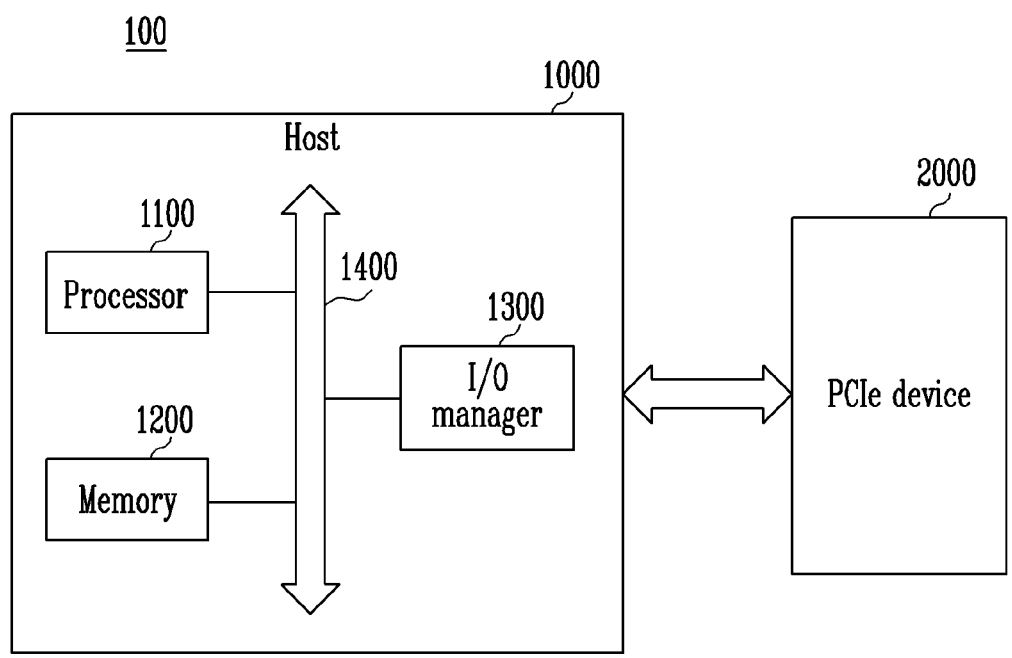
FIG. 1 illustrates an example of a computing system according to an embodiment of the present disclosure.

FIG. 1 illustrates an example of a computing system 100 according to an embodiment of the present disclosure.

Referring to FIG. 1, the computing system 100 may include a host 1000 and a Peripheral Component Interconnect Express (PCIe) device 2000. The computing system 100 may be, for example, a cellular phone, a smartphone, an MP3 player, a laptop computer, a desktop computer, a game player, a TV, a tablet PC, or an in-vehicle infotainment system.

The host 1000 may include a processor 1100, a memory 1200, an input/output (I/O) manager 1300, and a bus 1400. Components of the host 1000 may exchange signals and data through the bus 1400.

The processor 1100 may include circuits, interfaces, or program codes for processing data and controlling operations of components of the computing system 100. For example, the processor 1100 may include a CPU (such as an ARM™ processor), a microcontroller, or an application specific integrated circuit (ASIC).

The memory 1200 may include SRAM or DRAM that stores data, commands, or program codes necessary for operations of the computing system 100. However, the processor 1100 may include a non-volatile memory. According to an embodiment, the memory 1200 may include program codes that may operate to execute one or more operating systems (OS) and virtual machines (VM) and program codes that execute a virtualization intermediary (VI) for managing the virtual machines.

The processor 1100 may execute one or more operating systems and virtual machines by driving the program codes stored in the memory 1200. In addition, the processor 1100 may execute the virtualization intermediary for managing the virtual machines. In this manner, the processor 1100 may control operations of the components of the computing system 100.

The I/O manager 1300 may be an adapter that connects input/output devices to the host 1000. For example, the I/O manager 1300 may include a Universal Serial Bus (USB) adapter, a Peripheral Component Interconnect (PCI) or a PCI Express (PCIe) adapter, a Small Computer System Interface (SCSI) adapter, a Serial AT Attachment (SATA) adapter, a NonVolatile Memory express (NVMe) adapter, or combinations thereof. The I/O manager 1300 may include circuits, interfaces, or codes that are operable to communicate information with devices connected to the computing system 100. The I/O manager 1300 may include one or more standardized buses and one or more bus controllers. Therefore, the I/O manager 1300 may perceive the devices connected to the bus 1400, list the devices connected to the bus 1400, and perform resource allocation and deallocation for various devices connected to the bus 1400. In other words, the I/O manager 1300 may operate to manage communications over the bus 1400. For example, the I/O manager 1300 may be a PCI or PCIe system and include PCIe root complex (RC), one or more PCIe switches, or bridges. For example, the I/O manager 1300 may be controlled by the virtualization intermediary.

PCI may define a bus protocol that is used to connect the I/O devices to the processor 1100. PCIe may have the concept of programming defined by the PCI standards and define a physical communication layer as a high-speed serial interface.

The PCIe device 2000 may communicate with the host 1000 using PCIe. For example, the PCIe device 2000 may be implemented as various I/O device types such as networks and storages.

According to an embodiment, the PCIe device 2000 may be defined as an endpoint or a device including an endpoint.

An endpoint may refer to a type of a function that may be a requester or a completer of a PCIe transaction. Endpoints may be classified into legacy endpoints, PCI Express (PCIe) endpoints, or root complex integrated (RCiEP) endpoints.

A legacy endpoint may be a function with a type 00h configuration space header. A legacy endpoint may support configuration requests as a completer. A legacy endpoint may support I/O requests as a completer. A legacy endpoint may accept I/O requests for either or both of 80*h* and 84*h* locations regardless of an I/O decode configuration of the corresponding endpoint. A legacy endpoint may support I/O requests. A legacy endpoint must not issue a locked request. A legacy endpoint may implement extended configuration space capabilities. A legacy endpoint operating as a requester of a memory transaction may not be required to generate addresses of 4 GB or more. When an interrupt resource is requested, a legacy endpoint may be required to support Message Signaled Interrupt (MSI) or MSI-X, or both. When MSI is implemented, a legacy endpoint may support a 32-bit or 64-bit message address version with an MSI functional structure. A legacy endpoint may support 32-bit address designation with respect to a base address register requesting a memory resource. A legacy endpoint may appear within one of the hierarchy domains originated by a root complex.

A PCIe endpoint may be a function with a type 00h configuration space header. A PCIe endpoint may support configuration requests as a completer. A PCIe endpoint must not depend on operating system allocation of I/O resources claimed through base address registers (BARs). A PCIe endpoint may not generate I/O requests. A PCIe endpoint may not support locked requests as a completer or generate locked requests as a requester. PCIe-compliant software drivers and application programs may be written to prevent the use of lock semantics when accessing a PCIe endpoint. A PCIe endpoint operating as a requester of a memory transaction may generate an address of more than 4 GB. A PCIe endpoint may be required to support Message Signaled Interrupt (MSI), MSI-X, or both when an interrupt resource is requested. When MSI is implemented, a PCIe endpoint may support a 64-bit message address version with an MSI functional structure. A minimum address range requested by a base address register may be 128 bytes. A PCIe endpoint may appear within one of the hierarchy domains originated by a root complex.

RCiEPs may be implemented on internal logic of root complexes that contains root ports. An RCiEP may be a function with a type 00h configuration space header. An RCiEP may support configuration requests as a completer. An RCiEP may not request I/O resources claimed through base address registers. An RCiEP may not generate I/O requests. An RCiEP may not support locked requests as a completer or generate locked requests as a requester. PCIe-compliant software drivers and application programs may be written to prevent the use of lock semantics when accessing an RCiEP. An RCiEP operating as a requester of a memory transaction may generate an address equal to or greater than that which may be processed by the host 1000 as a completer. An RCiEP may be required to support MSI, MSI-X, or both when an interrupt resource is requested. When MSI is implemented, an RCiEP may support a 32-bit or 64-bit message address version with an MSI functional structure. An RCiEP may support 32-bit address designation with respect to a base address register requesting a memory resource. An RCiEP may implement link capabilities, link status, link control, link capabilities 2, link status 2, and link control 2 registers in the PCIe extended capability. An RCiEP may not implement active state power management. An RCiEP may not be hot-plugged independent of the root complex as a whole. An RCiEP may not appear in hierarchy domains exposed by the root complex. An RCiEP may not appear in switches.

According to an embodiment, the PCIe device 2000 may generate at least one virtual device. For example, the PCIe device 2000 may store program codes for generating at least on virtual device.

According to an embodiment, the PCIe device 2000 may generate a physical function (PF) device or a virtual function (VF) device in response to a virtualization request received from the host 1000. For example, a physical function device may be set to a virtual device in which a virtualization intermediary is granted access rights. A virtual function device may be set to a virtual device that is assigned to a virtual machine of the host 1000.

Figure 2:
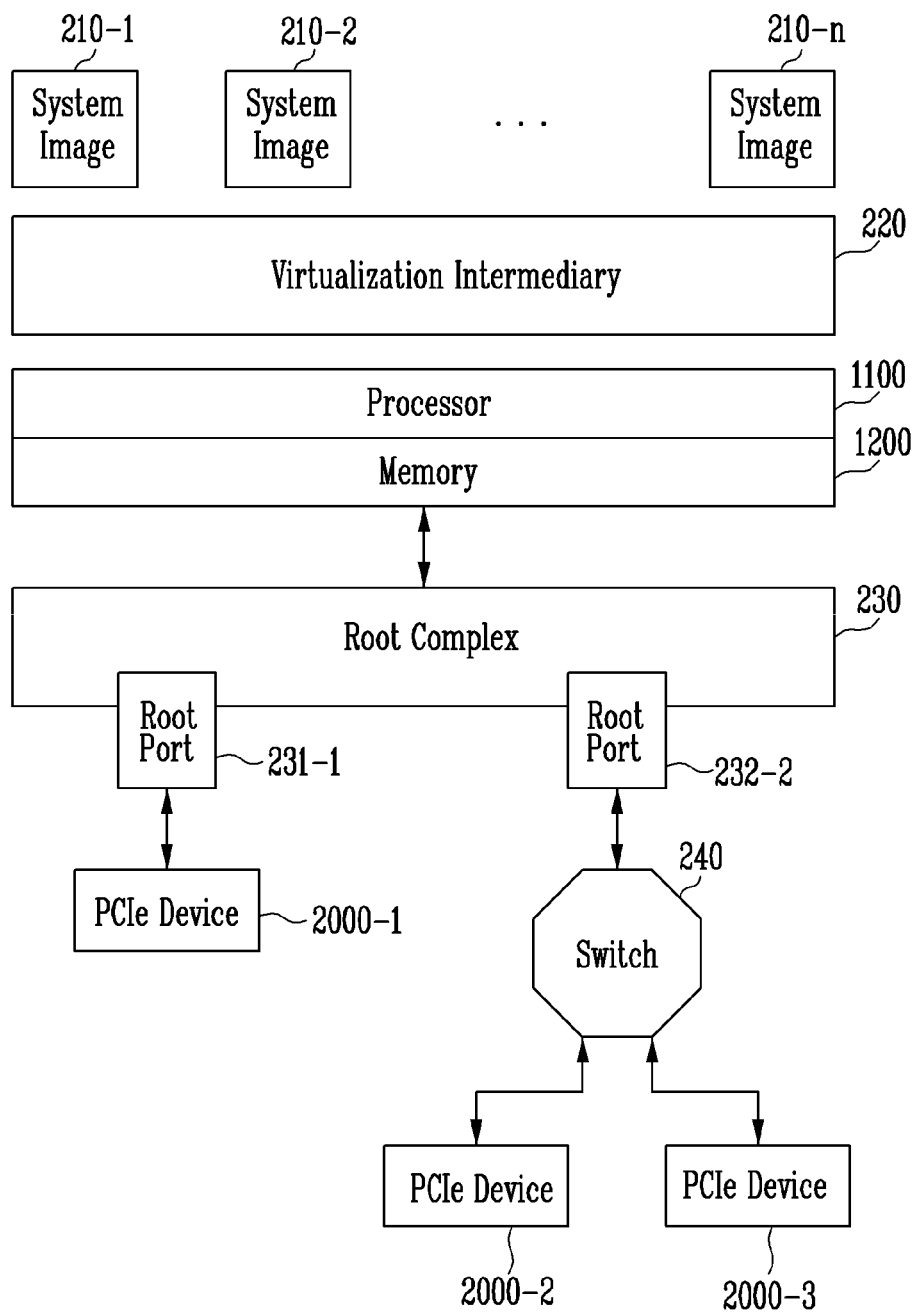
FIG. 2 illustrates another example of a computing system according to an embodiment of the present disclosure.

FIG. 2 illustrates another example (a computing system 200) of a computing system according to an embodiment of the present disclosure.

According to an embodiment, FIG. 2 shows an example of a general platform configuration where PCIe is available.

Referring to FIG. 2, the computing system 200 may include the processor 1100, the memory 1200, a plurality of system images 210-1 to 210-*n*, a virtualization intermediary 220, a root complex 230, a switch 240, and a plurality of PCIe devices 2000-1 to 2000-3.

The processor 1100 and the memory 1200 as shown in FIG. 2 may indicate the processor 1100 and the memory 1200 as shown in FIG. 1, respectively. According to an embodiment, the processor 1100, the memory 1200, the plurality of system images 210-1 to 210-*n*, the virtualization intermediary 220, the root complex 230, and the switch 240 may be included in the host 1000 of FIG. 1. According to an embodiment, the plurality of PCIe devices 2000-1 to 2000-3 may indicate the PCIe device 2000 of FIG. 1.

The system images 210-1 to 210-*n* may refer to software components that are executed in a virtual system to which PCIe functions are assigned. According to an embodiment, the system images 210-1 to 210-*n* may be referred to as virtual machines. The system images 210-1 to 210-*n* may be software such as operating systems that are used to execute applications or reliable services. For example, each of the system images 210-1 to 210-*n* may be respectively configured as a guest OS, a shared or non-shared I/O device driver, or the like. To increase effective hardware resource utilization without hardware modifications, the plurality of system images 210-1 to 210-*n* may be executed in the computing system 200.

According to an embodiment, a PCIe function may refer to an independent operation unit for providing physical resources included in the PCIe devices 2000-1 to 2000-3. In the present disclosure, a PCIe function and a "function" may refer to the same meaning.

The virtualization intermediary 220 may be a software component that supports one or more system images 210-1 to 210-*n*. According to an embodiment, the virtualization intermediary 220 may be referred to as hypervisor or a virtual machine monitor (VMM). The virtualization intermediary 220 may be interposed between hardware such as the processor 1100 and the memory 1200 and the system images 210-1 to 210-*n*. I/O operations (inbound or outbound) in the computing system 200 may be intercepted and processed by the virtualization intermediary 220. The virtualization intermediary 220 may present the abstract hardware resources to the system images 210-1 to 210-*n* with its own virtual system. The actual hardware resources available to each of the system images 210-1 to 210-*n* may vary depending on workload or customer-specific policies.

The root complex 230 may signify the root of an I/O hierarchy that connects the processor 1100/memory 1200 subsystem to an I/O. According to an embodiment, the root complex 230 may be implemented as one configuration of the I/O manager 1300 as shown in FIG. 1.

The computing system 200 may include at least one root complex 230. In addition, each root complex 230 may include one or more root ports 231-1 and 232-2. Each of the root ports 231-1 and 232-2 may show a separate hierarchy. The root complex 230 may communicate with the switch 240 or the PCIe devices 2000-1 to 2000-3 through the root ports 231-1 and 232-2.

The capability to route peer-to-peer transactions between hierarchy domains through the root complex 230 may be optional. A hierarchy domain may be composed of a single endpoint or a sub-hierarchy containing one or more switches and endpoints.

The root complex 230 may split a packet into smaller packets when routing peer-to-peer transactions between hierarchy domains. For example, the root complex 230 may a single packet having a 256-byte payload into two packets each having a 128-byte payload. However, the root complex 230 that supports peer-to-peer routing of vendor-defined messages may not split a vendor-defined message into smaller packets except at 128-byte boundaries (i.e., all resulting packets except the last packet must be an integral multiple of 128 bytes).

The root complex 230 may support generation of configuration requests as a requester. The root complex 230 may support the generation of I/O requests as a requester.

The root complex 230 may not support lock semantics as a completer. The root complex 230 may support generation of locked requests as a requester.

The switch 240 may be defined as a logical assembly of various virtual PCI-to-PCI bridges. The switch 240 may communicate with the PCIe devices 2000-2 and 2000-3.

The switch 240 may appear as configuration software with two or more logical PCI-to-PCI bridges.

The switch 240 may forward transactions using PCI bridge mechanisms. The switch 240 may forward all types of transaction layer packets (TLPs) between all port sets. The switch 240 may support locked requests.

The switch 240 may not be allowed to split a packet into smaller packets.

Arbitration between ingress ports of the switch 240 may be implemented using round robin or weighted round robin when contention occurs on the same virtual channel.

Endpoints may not appear in configuration software on the internal bus of the switch 240 as peers of the virtual PCI-to-PCI bridges representing the switch downstream ports.

Figure 3:
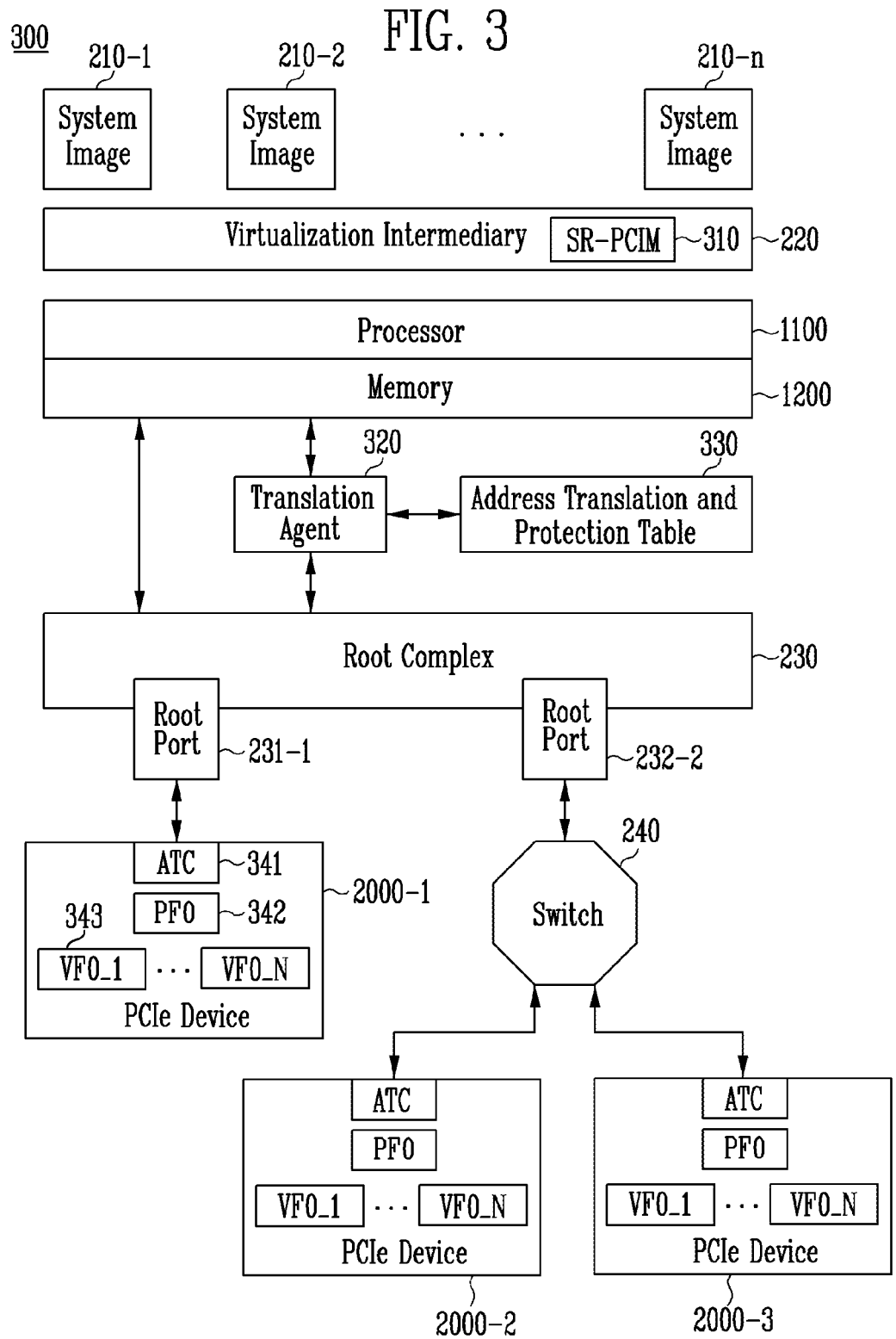
FIG. 3 illustrates another example of a computing system according to an embodiment of the present disclosure.

FIG. 3 illustrates another example (a computing system 300) of a computing system according to an embodiment of the present disclosure.

According to an embodiment, FIG. 3 shows an example of a Single Root input/output Virtualization (SR-IOV) configuration platform.

Single Root I/O Virtualization (SR-IOV) may enable the system images 210-1 to 210-*n* to share PCIe hardware resources in a virtual environment. According to an embodiment, SR-ION/may be developed to improve I/O performance of the PCIe devices 2000-1 to 2000-3 and directly connect the system images 210-1 to 210-*n* and the PCIe devices 2000-1 to 2000-3. Therefore, in the computing system 300 that contains SR-ION/capability, one or more PCIe devices 2000-1 to 2000-3 or PCIe functions may be assigned to one of the system images 210-1 to 210-*n*. According to an embodiment, the SR-IOV capability may have a specification that a single PCIe device (2000-1 to 2000-3) may appear as individual PCI devices 2000-1 to 2000-3 on the system image (210-1 to 210-*n*) under a single root port. According to an embodiment, the PCIe devices 2000-1 to 2000-3 supporting the SR-ION/capability may display a plurality of instances, i.e., PCIe functions on the system images 210-1 to 210-*n*. In addition, in the computing system 300 to which the SR-ION/capability is applied, the root complex 230 may directly connect the system images 210-1 to 210-*n* to the PCIe functions without the virtualization intermediary 220. Therefore, by using the SR-ION/capability, the root complex 230 may directly connect the system images 210-1 to 210-*n* of the host 1000 to the PCIe functions not via the virtualization intermediary 220.

Referring to FIG. 3, the computing system 300 may include the processor 1100, the memory 1200, the plurality of system images 210-1 to 210-*n*, the virtualization intermediary 220, the root complex 230, the switch 240, a single root PCI manager (SR-PCIM) 310, a translation agent (TA) 320, an address translation and protection table (ATPT) 330, and the plurality of PCIe devices 2000-1 to 2000-3.

Relative to the computing system 200 of FIG. 2, the computing system 300 as shown in FIG. 3 may further include the single root PCI manager 310, the translation agent 320, and the address translation and protection table 330.

The plurality of PCI devices 2000-1 to 2000-3 as shown in FIG. 3 may represent the plurality of PCIe devices 2000-1 to 2000-3 of FIG. 2. In addition, each of the PCIe devices 2000-1 to 2000-3 may include an address translation cache (ATC) 341, a physical function (PF0) 342, and a plurality of virtual functions (VF_0 to VF_N) 343. For convenience of explanation, FIG. 3 illustrates one physical function. However, according to embodiments, there may be a plurality of physical functions.

The single root PCI manager 310 may include software responsible for the configuration of the SR-IOV capability, management of the physical functions 342 and the virtual functions 343, processing of associated error events, and overall device controls such as power management and hot plug services. According to an embodiment, the single root PCI manager 310 may be logically located in the virtualization intermediary 220.

The translation agent 320 may be hardware, or a combination of hardware and software responsible for translating an address within a PCIe transaction into an associated platform physical address. The translation agent 320 may include an address translation cache to accelerate translation table access. In addition, the translation agent 320 may support address translation services (ATS) which enables a PCIe function to obtain address translations a priori to DMA access to the associated memory. In an SR-IOV implementation, the use of the translation agent 320 may be optional.

The address translation and protection table 330 may contain the set of address translations accessed by the translation agent 320 to process PCIe requests (DMA read, DMA write, or interrupt request). In PCIe, interrupts may be treated as memory write operations. Through a combination of a requester identifier and an address contained within a PCIe transaction, an interrupt may be routed to any target (e.g., a processor core) transparent to the associated I/O function. DMA read and write requests may be translated through a combination of a routing ID and the address contained within the PCIe transaction. The use of the address translation and protection table 330 may be optional in an SR-ION/implementation.

The address translation cache 341 may exist in two locations within a platform. For example, the address translation cache 341 may be integrated within the translation agent 320, located in an RC, or located in the PCIe devices 2000-1 to 2000-3. In the PCIe devices 2000-1 to 2000-3, the address translation cache 341 may be populated using the ATS technology. A PCIe transaction indicating that a translated address is contained may bypass the address translation cache 341 of a platform to improve performance without damaging advantages related to the address translation and protection table 330. The use of the address translation cache 341 may be optional in an SR-IOV implementation.

The physical function 342 may be a PCIe function that supports the SR-ION/capability and accesses the single root PCI manager 310, the virtualization intermediary 220 or the system images 210-1 to 210-*n*.

The virtual function 343 may be a light-weight PCIe function that may directly access the system images 210-1 to 210-*n*. The virtual function 343 may operate as a virtual instance of the physical function 342. Thus, from point-of-view of the system images 210-1 to 210-*n*, the virtual function 343 may appear as an instance of the physical function 342. Resources associated with a main data movement of a function may be used in the system images 210-1 to 210-*n*. The virtual function 343 may be shared serially by different system images 210-1 to 210-*n*. For example, the virtual function 343 may be assigned to one system image (210-1 to 210-*n*), reset, and then be assigned to another system image (210-1 to 210-*n*). The virtual function 343 may be selectively migrated from one physical function 342 to another physical function. All virtual functions 343 associated with the physical function 342 may be the same device type as the physical function 342 (e.g., the same network device type or the same storage device type).

Figure 4:
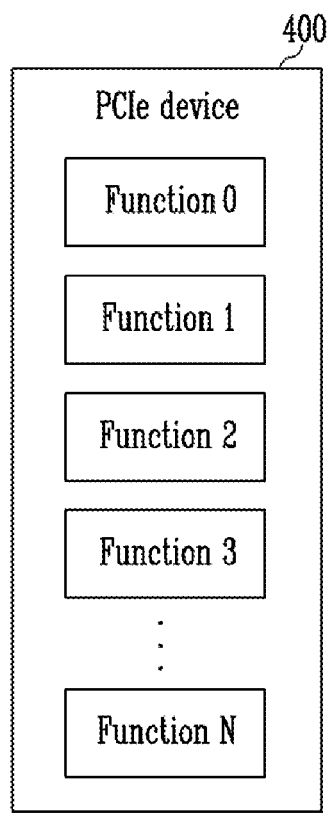
FIG. 4 illustrates a multi-function device according to an embodiment of the present disclosure.

FIG. 4 illustrates a multi-function device according to an embodiment of the present disclosure.

A PCIe device 400 as shown in FIG. 4 may represent one of the PCIe device 2000 as shown in FIG. 1 and the PCIe devices 2000-1 to 2000-3 as shown in FIGS. 2 and 3.

Referring to FIG. 4, the PCIe device 400 may include a plurality of functions Function 0 to Function N. According to an embodiment, the plurality of functions Function 0 to Function N may be physical functions. When all functions Function 0 to Function N included in the PCIe device 400 are physical functions, the corresponding PCIe device 400 may be defined as a multi-function device.

According to an embodiment, the plurality of functions Function 0 to Function N may share a common PCIe link. The link and PCIe functionality shared by all functions Function 0 to Function N may be managed through the zeroth function Function 0.

According to an embodiment, the plurality of functions Function 0 to Function N may support the Alternative Routing Identifier (ARI) capability. In addition, the plurality of Alternative Routing Identifier (ARI) capability may use a single bus number captured through a PCI enumeration process.

According to an embodiment, the plurality of functions Function 0 to Function N may support ATS capability. The plurality of functions Function 0 to Function N may include an address translation cache for managing an ATS obtained translated address.

According to an embodiment, each of the plurality of functions Function 0 to Function N may include unique physical resources including a separate configuration space, a base address register (BAR), and the like. The physical resources may refer to some of the physical resources of the PCIe device 400. In other words, the plurality of functions Function 0 to Function N may provide physical resources to the assigned system images.

The plurality of functions Function 0 to Function N may be assigned to the system images, respectively. To prevent one system image from impacting another system image, all PCIe configuration operations may be intercepted and processed by the virtualization intermediary.

According to an embodiment, the configuration space of each of the plurality of functions Function 0 to Function N may include a type 0 configuration space header. For example, the type 0 configuration space header may include a header type register and an interrupt pin register.

The header type register may be included in the type 0 configuration space header of the configuration space. The header type register may identify whether multi-functions may be included in a layout of a predefined second portion (starting from a 10h byte of the configuration space) and the PCIe device 400. For example, a multi-function device field of a header type register may be included. When the multi-function device field is set, the PCIe device 400 may include the plurality of functions Function 0 to Function N. Software may probe for the other functions Function 1 to Function N except for the zeroth function Function 0.

The interrupt pin register may be a read-only register that identifies a legacy interrupt message the function uses. Valid values may be 01h, 02h, 03h and 04h that are mapped to the legacy interrupt message for INTA, INTB, INTC and INTD, respectively. The value 00*h* may indicate that the function does not use the legacy interrupt message. The values 05*h* to FFh may be reserved. The PCI Express may define one legacy interrupt message for a single function device and define up to four legacy interrupt messages for the multi-function device. For the single function device, only INTA may be used. All functions Function 0 to Function N of the multi-function device may use INTx messages. When a device implements a single legacy interrupt message, it should be INTA. When two legacy interrupt messages are implemented, it should be INTA and INTB. For a multi-function device, all functions Function 0 to Function N may use the same INTx, or each may have its own (up to a maximum of four), or a combination thereof.

According to an embodiment, the configuration space of all functions Function 0 to Function N may be included in a PCIe capability structure. For example, the PCIe capability structure may include a PCIe capability register, a device capabilities register, a device control register, a device status register, a link capabilities register, a link control register, a link status register, a slot capabilities register, a slot control register, a slot status register, a root control register, a root capabilities register, a root status register, a device capabilities 2 register, a device control 2 register, a device status 2 register, a link capabilities 2 register, a link control 2 register, a link status 2 register, a slot capabilities 2 register, a slot control 2 register, a slot status 2 register, a root controller 2 register, a root capabilities 2 register, a root status 2 register, and the like.

The PCIe capability register may identify a PCIe device function type and associated capabilities. According to an embodiment, the PCIe capability register may be a 16-bit register. The bits 3:0 of the PCIe capability register may a capability version field. The capability version field may have a read only attribute. More specifically, the capability version field may indicate a PCI-SIG defined PCI Express function structure version number. The bits 7:4 of the PCIe capability register may be a device/port type field. The device/port type field may have a read only attribute. More specifically, the device/port type field may indicate a specific type of a function. In the device/port type field, functions of a multi-function device may refer to different types. The bit 8 of the PCIe capability register may be a slot implemented field. The slot implemented field may have a hardware initialized (HwInit) attribute. When the slot implemented field is set, it may mean that a link connected to this port is connected to a slot. The bits 13:9 of the PCIe capability register may be an interrupt message number field. The interrupt message number field may have a read only attribute. The interrupt message number field may indicate which MSI/MSI-X vector is used for an interrupt message generated in association with a status bit with a function structure. For MSI, a value of the interrupt message number field may indicate an offset between a base message data and the generated interrupt message. For MSI-X, the value of the interrupt message number field may indicate an MSI-X table entry used to generate the interrupt message. When both MSI and MSI-X are implemented, MSI and MSI-X may be permitted to use different vectors though software must enable only one mechanism at a time. For example, when MSI-X is enabled, the value of the interrupt message number field may indicate an MSI-X vector. When MSI is enabled, or none of MSI and MSI-X is enabled, the value of the interrupt message number field may indicate a vector for MSI. When both MSI and MSI-X are enabled at the same time, the value in the interrupt message number field may not be defined. The bit 14 of the PCIe capability register may have a read only attribute and may not be defined.

The device capability register may identify PCIe device function-specific capabilities. According to an embodiment, the device capability register may be a 32-bit register. The bits 2:0 of the device capability register may be a maximum payload size supported (Max Payload Size Supported) field. The max payload size supported field may have a read only attribute. The max payload size supported field may indicate a maximum payload size that supports TLP. The functions Function 0 to Function N of the multi-function device may have different values for this field. The bits 4:3 of the device capability register may be a phantom functions supported field. The phantom functions supported field may have a read only attribute. The phantom functions supported field may indicate the support for use of unclaimed function numbers to extend the number of outstanding transactions allowed by logically combining the unclaimed functions numbers with a tag identifier.

The device control register may control a PCIe device-specific parameter. According to an embodiment, the device control register may be a 16-bit register. The bit 0 of the device control register may be a correctable error reporting enable field. The correctable error reporting enable field may control sending ERR_COR messages in conjunction with other bits. For the multi-function device, the correctable error reporting enable field may control error reporting of each function (Function 0 to Function N). The correctable error reporting enable field may have a read-write (RW) attribute. The bit 1 of the device control register may be a non-fatal correctable error reporting enable field. The non-fatal correctable error reporting enable field may control sending ERR NONFATAL messages in conjunction with other bits. For the multi-function device, the non-fatal error reporting enable field may control error reporting for each function (Function 0 to Function N) from point-of-view of each function (Function 0 to Function N). The non-fatal error reporting enable field may have a read-write attribute. The bit 2 of the device control register may be a fatal error reporting enable field. The fatal error reporting enable field may control sending ERR_FATAL messages in conjunction with other bits. For the multi-function device, the fatal error reporting enable field may control error reporting for each function (Function 0 to Function N) from a point-of-view of each function (Function 0 to Function N). The fatal error reporting enable field may have a read-write attribute. The bit 3 of the device control register may be an unsupported request reporting enable field. The unsupported request reporting enable field may control signaling of unsupported request errors by sending error messages in conjunction with other bits. For the multi-function device, the unsupported request reporting enable field may control error reporting for each function (Function 0 to Function N) from point-of-view of each function (Function 0 to Function N). The unsupported request reporting enable field may have a read-write attribute. The bits 7:5 of the device control register may be a maximum payload size (Max_Payload_Size) field. The max payload size field may set the maximum TLP payload size for a function. As a receiver, a function must not generate TLP exceeding a set value. As a transmitter, permissible values may be indicated by the max payload size supported field of the function capability register. All functions Function 0 to Function N of the multi-function device may have different values in the max payload size field. For Alternative Routing Identifier (ARI) devices, the max payload size field may be determined solely by the setting in the zeroth function Function 0. The settings in the other functions may always return whatever values software programmed for each, but otherwise may be ignored by components. The max payload size field may have a read-write attribute.

The device status register may provide information about a PCIe device (function)-specific parameter. According to an embodiment, the device status register may be a 16-bit register. The bit 0 of the device status register may be a correctable error detected field. The correctable error detected field may indicate that correctable errors are detected. The correctable errors may be recorded in the correctable error detected field regardless of whether error reporting is enabled in the device control register. For a multi-function device, each function (Function 0 to Function N) may indicate an error status that is perceived by each function (Function 0 to Function N). The correctable error detected field may have a Write-1-to-clear status (RW1C) attribute. The bit 1 of the device status register may be a non-fatal correctable error detected field. The non-fatal correctable error detected field may indicate that non-fatal errors are detected. The non-fatal errors may be recorded in the non-fatal error detected field regardless of whether error reporting is enabled in the device control register. For a multi-function device, each function (Function 0 to Function N) may indicate an error status that is perceived by each function (Function 0 to Function N). A non-fatal error detected field may have an RW1C attribute. The bit 2 of the device status register may be a fatal error detected field. The fatal error detected field may indicate status of fatal errors detected. The fatal errors may be recorded in the fatal error detected field regardless of whether error reporting is enabled in the device control register. For a multi-function device, each function (Function 0 to Function N) may indicate an error status that is perceived by each function (Function 0 to Function N). A fatal error detected field may have an RW1C attribute. The bit 3 of the device status register may be an unsupported request field. The unsupported request detected field may indicate that a function has received unsupported requests. Errors may be recorded in the unsupported request detected field regardless of whether error reporting is enabled in the device control register. For a multi-function device, each function (Function 0 to Function N) may indicate an error status that is perceived by each function (Function 0 to Function N). The unsupported request detected field may have an RW1C attribute. The bit 6 of the device status register is an emergency power reduction detected field which may be set when the functions Function 0 to Function N enter emergency power reduction state. Each time a condition for which an emergency power reduction state is input exists, the functions Function 0 to Function N may maintain the emergency power reduction state. The multi-function device coupled to an upstream port may set the emergency power reduction detected field in all functions Function 0 to Function N that support the emergency power reduction state. The emergency power reduction detected field may have an RW1C attribute.

The link capability register may identify PCIe link-specific capability. For a multi-function device, field values of the link capability register of all functions Function 0 to Function N may be the same.

According to an embodiment, the configuration space of each of the plurality of functions Function 0 to Function N may include Message Signaled Interrupt (MSI) Capability Structures, Secondary PCI Express Extended Capability, Data Link Feature Extended Capability, and ACS Extended Capability. All functions Function 0 to Function N that generate interrupts may implement MSI or MSI-X.

In addition, the configuration space of each of the plurality of functions Function 0 to Function N may include various registers associated with the multi-function device in addition to the above-described registers.

According to an embodiment, the plurality of functions Function 0 to Function N may perform an error handling operation. For example, the plurality of functions Function 0 to Function N may perform an error handling operation using advanced error reporting (AER). For example, when an error is detected, the plurality of PCIe functions Function 0 to Function N may perform an error handling operation by indicating an error status through a completion status field, by sending an error message to a root complex, or by error forwarding.

According to an embodiment, the plurality of functions Function 0 to Function N may perform a function level reset (FLR) operation. For example, the plurality of functions Function 0 to Function N may perform a function level reset (FLR) operation at the request of a host.

A function level reset mechanism may enable software to quiesce and reset endpoint hardware with function-level granularity.

The function level reset may apply to each of the functions Function 0 to Function N. Only the target function (Function 0 to Function N) may be affected by a function level reset operation. The link status may not be affected by the function level reset.

The function level reset may modify the statuses of the functions Function 0 to Function N.

For example, except for sticky-type registers (ROS, RWS, RW1CS), HwInit type defined registers, and other such fields or registers, function registers and function-specific state machines may be set to initial values of function registers and function-specific state machines.

In addition, function level reset may modify function states such as a captured slot power limit value of a device capability register, a captured slot power limit scale of the device capability register, Max_Payload_Size of a device control register, Active State Power Management (ASPM) control of a link control register, a Read Completion Boundary (RCB) of the link control register, Common Clock Configuration of the link control register, Extended Synch of the link control register, Enable Clock Power Management of the link control register, Hardware Autonomous Width Disable of the link control register, Hardware Autonomous Speed Disable of a link control 2 register, a Link Equalization 8.0 GT/s request of a link state 2 register, a link equalization request 16.0 GT/s of a 16.0 GT/s state register, a Lane Equalization Control register of a Secondary PCI Express Extended Capability structure, a 16.0 GT/s Lane Equalization Control register of a Physical Layer 16.0 GT/s Extended Capability structure, a Virtual Channel Capability structure of all registers, all registers of a Multi-Function Virtual Channel Capability structure, all registers of a Data Link Feature Extended Capability structure, all registers of a Physical Layer 16.0 GT/s Extended Capability structure, and all registers of Lane Margining of a Receiver Extended Capability structure.

Controls that enable the functions Function 0 to Function N to initiate requests on PCI express may be cleared, including Bus Master Enable, MSI interrupt enable, and the like, effectively causing the functions Function 0 to Function N to become quiescent on the link.

Port state machines associated with link functionality including those in the physical and data link layers may not be reset by FLR, and VC0 may remain initialized following an FLR. Any outstanding INTx interrupt asserted by the functions Function 0 to Function N may be deasserted by sending the corresponding Deassert_INTx Message prior to starting the FLR.

When the FLR is initiated to the functions Function 0 to Function N of the PCIe device 400, if another Function continues to assert a matching INTx, no Deassert_INTx Message will be transmitted.

After an FLR has been initiated by writing a 1*b* to the Initiate Function Level Reset bit, the functions Function 0 to Function N must complete the FLR within 100 ms. If software initiates an FLR when the transactions pending bit is 1b, then software must not initialize the functions Function 0 to Function N until allowing adequate time for any associated Completions to arrive, or to achieve reasonable certainty that any remaining completions will never arrive. Thus, the computing system may allow as much time as provided by the pre-FLR value for Completion Timeout. If completion timeouts are disabled on the functions Function 0 to Function N when the FLR is issued, then the delay may be system dependent but may be 100 ms or more. When a function ready status is implemented, a computing system may issue a configuration request to the functions Function 0 to Function N right after receiving a function level reset message indicating that it is completely prepared for configuration.

Upon receipt of an FLR, the functions Function 0 to Function N may either clear all transaction statuses including Transactions Pending, or may set the Completion Timeout to its default value so that all pending transactions may time out during FLR execution. The transactions pending bit may be clear upon completion of the FLR.

Since FLR modifies Function state, the behavior of FLR may be specified using a set of criteria that, when applied to the Functions Function 0 to Function N, show that the functions Function 0 to Function N have them. The following criteria must be applied using Function-specific knowledge to evaluate the functions Function 0 to Function N's behavior in response to an FLR.

The function (Function 0 to Function N) may not give the appearance of an initialized adapter with an active host on any external interfaces controlled by the corresponding function (Function 0 to Function N). The steps needed to terminate activity on the external interfaces may be exceptional. For example, a network adapter may not respond to queries that would require adapter initialization by the host system or interaction with an active host system, but may be permitted to perform an action that is designed to be performed without host initialization or interaction. When the network adapter includes multiple functions Function 0 to Function N that operate on the same external network interface, this rule may affect only those aspects associated with particular function reset by the FLR.

The functions Function 0 to Function N may not retain within itself software readable state that potentially includes secret information associated with any preceding use of the functions Function 0 to Function N. Main host memory assigned to the functions Function 0 to Function N may not be modified by the functions Function 0 to Function N. For example, a function (Function 0 to Function N) with internal memory readable directly or indirectly by host software may clear or randomize that memory.

The function (Function 0 to Function N) may return to a state such that normal configuration of the function (Function 0 to Function N)'s PCI Express interface may cause it to be useable by drivers normally associated with the functions Function 0 to Function N.

When an FLR is initiated, the targeted functions Function 0 to Function N must behave as follows:

The functions Function 0 to Function N may return the completion for the configuration write that initiates the FLR operation, and may then initiate the FLR.

While the FLR is in progress, when a request arrives, the request may be permitted to be silently discarded without logging or signaling it as an error. In addition, if a completion arrives, the completion may be permitted to be handled as an unexpected completion or to be silently discarded without logging or signaling it as an error.

When the function (Function 0 to Function N) is required to complete the FLR operation within a time limit, a subsequent function-specific initialization sequence may require an additional time. When the additional time is required, the function (Function 0 to Function N) may return a configuration request retry status (CRS) completion status when a configuration request is received after the time limit. After the function (Function 0 to Function N) responds to the configuration request with a completion status other than CRS, it may not be permitted to return the CRS until it is reset again.

Figure 5:
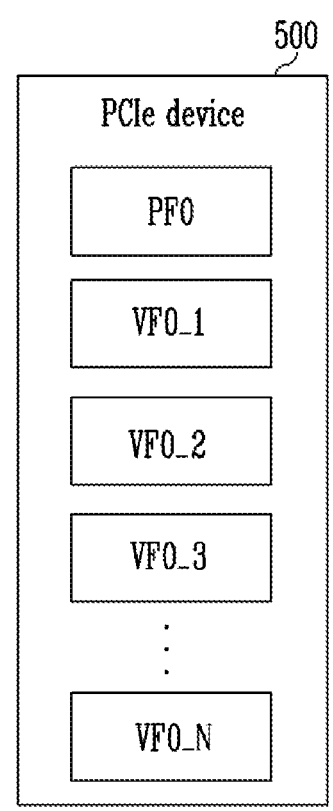
FIG. 5 illustrates an example of a PCIe device that is single root input/output virtualization (SR-IOV) capable according to an embodiment of the present disclosure.

FIG. 5 illustrates an example of a single root input/output virtualization (SR-IOV) capable PCIe device 500 according to an embodiment of the present disclosure.

The PCIe device 500 as shown in FIG. 5 may represent one of the PCIe device 2000 as shown in FIG. 1 and the PCIe devices 2000-1 to 2000-3 as shown in FIGS. 2 and 3.

For example, FIG. 5 may represent the PCIe device 500 to which SR-IOV capability is applied.

Referring to FIG. 5, the PCIe device 500 may include a physical function PF0 and a plurality of virtual functions VF0_1 to VF0_N associated with the physical function PF0. The virtual function VF0_1 may refer to a first virtual function that is associated with the physical function PF0. In the same manner, the virtual function VF0_N may refer to an $N^{th}$ virtual function that is associated with the physical function PF0. According to an embodiment, the configuration space, the register setting process, the error handling operation, and the function level reset operation as described above with reference to FIG. 4 may apply to the physical function PF0.

The physical function 0 PF0 may support SR-IOV capability. According to an embodiment, after a reset operation, the physical function 0 PF0 may disable the SR-IOV capability. To discover the page sizes supported by the physical function 0 PF0, and the plurality of virtual functions VF0_1 to VF0_N, Supported Page Sizes configuration field may be read.

The plurality of virtual functions VF0_1 to VF0_N may share a plurality of common configuration space fields with the physical function 0 PF0. Sharing may reduce the hardware resource requirements to implement the plurality of virtual functions VF0_1 to VF0_N. For example, the plurality of virtual functions VF0_1 to VF0_N may use the same configuration mechanisms and header types as the physical function 0 PF0. In addition, the plurality of virtual functions VF0_1 to VF0_N may share a VF BAR set. In addition, the plurality of virtual functions VF0_1 to VF0_N may share a VF memory space enable (MSE) bit that controls access to VF memory space. In other words, when the VF MSE bit is cleared, the memory mapped space allocated for all virtual functions VF0_1 to VF0_N may be disabled.

The InitialVFs and TotalVFs fields included in the SR-IOV capability may be used to discover the maximum number of virtual functions that may be associated with the physical function 0 PF0. For example, when the PCIe device 500 does not support VF migration, TotalVFs and InitialVFs may contain the same value. On the other hand, when the PCIe device 500 supports VF migration, if TotalVFs is read, the physical function 0 PF0 may return the number of virtual functions that may be assigned to the physical function 0 PF0. In addition, when InitialVFs is read, the physical function 0 PF0 may return the initial number of virtual functions assigned to the physical function 0 PF0.

The physical function 0 PF0 and the plurality of virtual functions VF0_1 to VF0_N may be assigned unique routing IDs. The Routing ID for each virtual function (VF0_1 to VF0_N) may be determined using the routing ID of the physical function 0 PF0 and fields included in the SR-IOV capability of the physical function 0 PF0.

All PCIe and SR-IOV configuration access may be carried out through a trusted software component such as a virtualization intermediary or a single root PCI manager.

According to an embodiment, the physical function 0 PF0 and the plurality of virtual functions VF0_1 to VF0_N may contain physical resources including configuration space. Each virtual function (VF0_1 to VF0_N) may contain a non-shared set of physical resources required to deliver Function-specific services, e.g., resources such as work queues, data buffers, etc. These resources may be directly accessed by a system image without requiring intervention of the virtualization intermediary or the single root PCI manager.

One or more virtual functions VF0_1 to VF0_N may be assigned to each system image. The physical function 0 PF0 and the plurality of virtual functions VF0_1 to VF0_N may include ATC.

According to an embodiment, the physical function 0 PF0 may be used to manage device-specific functionality such as internal resource allocation to each virtual function (VF0_1 to VF0_N), VF arbitration to shared resources such as the PCIe Link or the Function-specific Link (e.g., a network or storage Link), etc.

According to an embodiment, the configuration space of the physical function 0 PF0 may include the SR-IOV extended capability. For example, the SR-IOV extended capability may include an SR-IOV Extended Capability Header register, an SR-IOV Capabilities register, an SR-IOV Control register, an SR-ION/Status register, an InitialVFs register, a TotalVFs register, a NumVFs register, a Function Dependency Link register, a First VF Offset register, a VF Stride register, a VF Device ID register, a Supported Page Sizes register, a System Page Size register, a VF BAR0, VF BAR1, . . . , a VF BAR5, and a VF Migration State Array Offset register.

The SR-IVO control register may include a virtual function (VF) Enable field.

Virtual function enable may manage the assignment of the plurality of virtual functions VF0_1 to VF0_N with respect to the associated physical function 0 PF0. When the virtual function Enable is set, the plurality of virtual functions VF0_1 to VF0_N associated with the physical function 0 PF0 may be accessible in the PCI Express fabric. When the virtual function enable is set, the virtual functions VF0_1 to VF0_N may respond to and issue PCI Express transactions following rules for PCI Express Endpoint Functions.

When the virtual function enable is clear, the plurality of virtual functions VF0_1 to VF0_N may be disabled and may not be visible in the PCI Express fabric. Requests to these virtual functions VF0_1 to VF0_N may receive Unsupported Request (UR) and may not issue PCI Express transactions.

To allow components to perform internal initialization, after changing the virtual function enable bit from 0 to 1, the system may not be permitted to issue requests to the virtual functions VF0_1 to VF0_N which are enabled by the corresponding VF Enable bit until one of the following is true: at least 100 ms has passed; an FRS message has been received from the physical function 0 PF0 with a reason code of the virtual function Enabled; and at least VF Enable time has passed. The VF Enable time may be either a reset time value in the readiness time reporting capability associated with the virtual functions VF0_1 to VF0_N, or a value determined by system software/firmware.

The root complex and/or system software may allow at least 1.0 seconds after setting the VF Enable bit, before it may determine that the virtual function (VF0_1 to VF0_N) which fails to return a successful completion status for a valid configuration request is broken. After setting the VF Enable bit, the virtual functions VF0_1 to VF0_N enabled by the corresponding VF Enable bit may be permitted to return a CRS status to configuration requests up to the 1.0 s limit, when they are not ready to provide a successful completion status for a valid configuration request. After the physical function 0 PF0 transmits an FRS Message with a reason code of VF Enabled, no virtual functions VF0_1 to VF0_N associated with the corresponding physical function 0 PF0 is permitted to return CRS without an intervening VF disable or other valid reset conditions. After returning a successful completion to any request, the virtual functions VF0_1 to VF0_N may not be permitted to return CRS without an intervening VF disable or other valid reset conditions.

Since the virtual functions VF0_1 to VF0_N do not have an MSE bit (MSE in the virtual functions VF0_1 to VF0_N is controlled by the VF MSE bit in the SR-IOV capability in the physical function 0 PF0), it may be possible for software to issue a memory request before the virtual function (VF0_1 to VF0_N) is ready to handle the MSE bit. Therefore, Memory Requests may not be issued to the virtual functions VF0_1 to VF0_N until at least one of the following conditions has been met:

The virtual function (VF0_1 to VF0_N) has responded successfully to a Configuration Request. (CRS is not returned).

After issuing an FLR to the VF, at least one of the following is true: (1) at least 1.0 s has passed since the FLR was issued, (2) the virtual functions VF0_1 to VF0_N support Function Readiness Status and, after the FLR is issued, an FRS Message from the virtual functions VF0_1 to VF0_N with a reason code for FLR Completed has been received, or (3) at least FLR time has passed since the FLR is issued. FLR Time may be the FLR Time value in the Readiness Time Reporting capability associated with the virtual functions VFO_1 to VFO_N or a value determined by system software/firmware.

After setting VF Enable in the physical function 0 PFO, at least one of the following is true: (1) at least 1.0 s has passed since the VF Enable was set, (2) the physical function 0 PF0 supports Function Readiness Status and, after VF Enable is set, an FRS message from the physical function 0 PF0 with the reason code for the virtual function enabled has been received, or (3) minimum virtual function enable time has passed after the virtual function Enable is set. The virtual function enable time may be a reset time value in the Readiness Time Reporting capability associated with the virtual functions VF0_1 to VF0_N or a value determined by system software/firmware.

The virtual functions VF0_1 to VF0_N may be permitted to silently drop memory requests after an FLR is issued to the virtual functions VF0_1 to VF0_N or VF Enable has been set in the associated physical function 0 PF0 in the SR-IOV capability until the virtual functions VF0_1 to VF0_N respond successfully (without returning CRS) to any request.

Clearing VF Enable may effectively destroy the virtual functions VF0_1 to VF0_N. Setting VF Enable may effectively create the virtual functions VF0_1 to VF0_N. Setting VF Enable after it has previously been cleared may result in a new set of virtual functions VF0_1 to VF0_N. When the physical function 0 PF0 is in a D0 power state, the new virtual functions VF0_1 to VF0_N may be in the $D0_{uninitialized}$ state. If the physical function 0 PF0 is in a lower power state, a behavior may be undefined When VF Enable is clear, the physical function 0 PFO that supports FRS may send an FRS Message with FRS Reason of VF Disabled to indicate when this operation has been acompleted. The physical function 0 PFO may not be permitted to send this message when there are outstanding non-posted requests issued by the physical function 0 PFO or any of the virtual functions VF0_1 to VF0_N associated with the physical function 0 PFO. The FRS message may only be sent after these requests have been completed (or timed out).

When software Clears VF Enable, no field in the SR-IOV Extended Capability or the VF Migration State Array may be accessed until either:

At least 1.0 s has elapsed after VF Enable was cleared, or
The physical function 0 PF0 supports FRS and after VF enable was cleared, an FRS Message has been received from the physical function 0 PFO with a reason code of VF Disabled.

InitialVFs registers may indicate to SR-PCIM the number of virtual functions VF0_1 to VF0_N that are initially associated with the physical function 0 PF0.

TotalVFs registers may indicate the maximum number of virtual functions VF0_1 to VF0_N that may be associated with the physical function 0 PF0.

NumVFs registers may control the number of virtual functions VF0_1 to VF0_N that are visible.

Virtual function base address registers may define base address registers (BARs) of the virtual functions VF0_1 to VF0_N. When the virtual function base address register is written with an actual address value, and VF Enable and VF MSE are set, the BAR may map NumVFs BARs.

According to an embodiment, the configuration space of the physical function 0 PF and the virtual functions VF0_1 to VF0_N may include a type 0 configuration space header, a PCIe capability register, a PCI standard capability register, a PCIe extended capability register, and the like.

According to an embodiment, register field values included in the configuration space of the virtual functions VF0_1 to VF0_N may be subordinate to or independent from register field values included in the configuration space of the physical function 0 PF0. For example, the register field values included in the configuration space of the virtual functions VF0_1 to VF0_N may have a value of 0 (zero) when they are subordinate to the register field values included in the configuration space of the physical function 0 PF0. The virtual functions VF0_1 to VF0_N may perform a configuration operation according to the register field values of the associated physical function 0 PF0.

According to an embodiment, the plurality of virtual functions VF0_1 to VF0_N may perform an error handling operation. For example, when the physical function 0 PF0 handles an error using advanced error reporting, the virtual functions VF0_1 to VF0_N may also handle an error using advanced error reporting.

According to an embodiment, the plurality of virtual functions VF0_1 to VF0_N may perform a reset operation.

For example, the virtual functions VF0_1 to VF0_N may complete internal initialization when one of the following occurs:

The virtual function (VF0_1 to VF0_N) has responded successfully to a configuration request (CRS is not returned).

After issuing a function level reset to the virtual functions VF0_1 to VF0_N, one of the following is true: (1) at least 1.0 s has passed, (2) an FRS message from the virtual functions VF0_1 to VF0_N with a reason code FLR completed has been received, or (3) minimum FLR time has passed. The function level reset time may be a function level reset time value in the Readiness Time Reporting capability associated with the virtual functions VF0_1 to VF0_N or a value determined by system software/firmware.

After setting VF Enable in the physical function 0 PF0, at least one of the following may be true: (1) at least 1.0 s has passed since VF Enabled was set, or (2) after VF Enabled was set, an FRS message has been received from the physical function 0 PF0 with a reason code of VF enabled.

For the multi-function device as described above with reference to FIG. 4, it may be impossible to control the number of physical functions, and the physical functions may not be hidden when a guest OS kill operation is required. Similarly, for the virtual function described with reference to FIG. 5, to control the number of virtual functions, all virtual functions may need to be disabled. In addition, since most of the configuration spaces of the virtual functions are affected by physical functions to which they are subordinate, it may be impossible to carry out PCIe configuration setting for each virtual function. Therefore, the PCIe device enjoying both advantages of physical functions and virtual functions are in demand.

Figure 6:
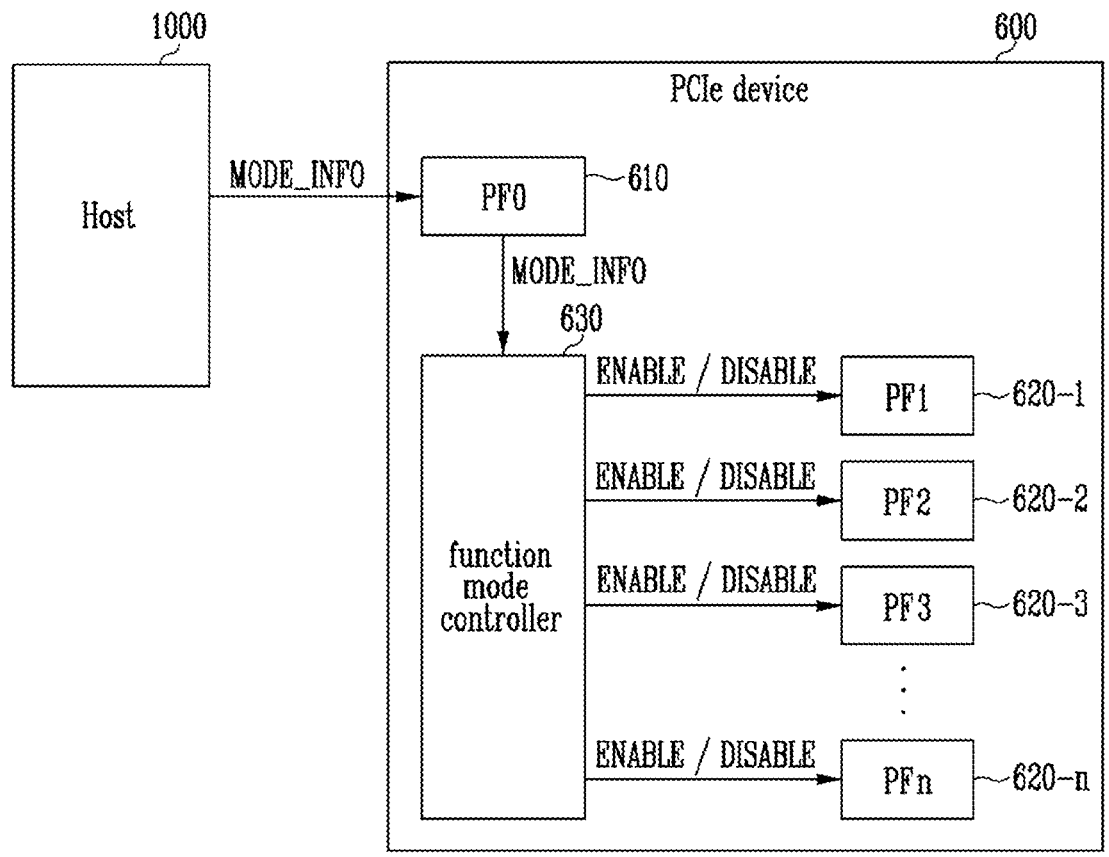
FIG. 6 illustrates a PCIe device according to an embodiment of the present disclosure.

FIG. 6 illustrates a PCIe device 600 according to an embodiment of the present disclosure.

The PCIe device 600 may communicate with the host 1000 through a PCIe link.

Referring to FIG. 6, the PCIe device 600 may include a physical function (PF) 0 610, physical functions 1 to n 620-1 to 620-n and a function mode controller 630. The PCIe device 600 may represent the PCIe device 2000 as shown in FIG. 1 or may be one of the PCIe devices 2000-1 to 2000-3 as shown in FIGS. 2 and 3. The physical function 0 610 may have the same configuration as the physical function 0 PF0 as described above with reference to FIG. 4 and the physical function 0 PF0 as described above with reference to FIG. 5. In the present specification, the physical function 0 610 may be referred to as a "first physical function." In addition, in the present specification, the physical functions 1 to n 620-1 to 620-n may be referred to as "a plurality of second physical functions."

The physical function 0 610 and the physical functions 1 to n 620-1 to 620-n may be PCIe functions. Each of the physical function 0 610 and the physical functions 1 to n 620-1 to 620-n may be assigned to one of the plurality of system images included in the host 1000. The plurality of system images may access the assigned physical functions of the physical functions 610 and 620-1 to 620-n.

According to an embodiment, each of the physical function 0 610 and the physical functions 1 to n 620-1 to 620-n may be an independent operation unit for providing physical resources included in the PCIe device 600. Each of the physical function 0 610 and the physical functions 1 to n 620-1 to 620-n may be assigned some of a plurality of physical resources included in the host 1000. Each of the physical function 0 610 and the physical functions 1 to n 620-1 to 620-n may provide the corresponding physical resources of the PCIe device 600 and of the host 1000 to each of the assigned system images.

The physical function 0 610 may be a function that is necessarily included in the PCIe device 600. According to an embodiment, the physical function 0 610 may be a function that may not be able to be disabled.

According to an embodiment, the physical function 0 610 may manage a PCIe link coupled to the host 1000. The PCIe link may be a common link that is shared by the physical function 0 610 and the physical functions 1 to n 620-1 to 620-n. Each of the physical function 0 610 and the physical functions 1 to n 620-1 to 620-n may transmit and receive data, packets, and the like to and from the assigned system images through the PCIe link.

In addition, the physical function 0 610 may manage PCIe functionality. The PCIe functionality may be common functionality shared by the physical function 0 610 and the physical functions 1 to n 620-1 to 620-n.

According to an embodiment, the physical function 0 610 may receive function mode control information MODE_INFO from the host 1000. The physical function 0 610 may provide the function mode control information MODE_INFO to the function mode controller 630.

The function mode control information MODE_INFO may include information for setting operation modes of the physical functions 1 to n 620-1 to 620-n. According to an embodiment, the function mode control information MODE_INFO may include at least one of a number of physical functions to be enabled among the physical functions 1 to n 620-1 to 620-n, identification information of the physical functions to be enabled, a number of physical functions to be disabled among the physical functions 1 to n 620-1 to 620-n, and identification information of the physical functions to be disabled. For example, when a plurality of physical functions are to be enabled, the function mode control information MODE_INFO may include the number of physical functions to be enabled among the physical functions 1 to n 620-1 to 620-n and the identification information of the physical function to be enabled. In another example, when a plurality of physical functions are to be disabled, the function mode control information MODE_INFO may include the number of physical functions to be disabled among the physical functions 1 to n 620-1 to 620-n and the identification information of the physical function to be disabled. In another example, when one physical function is to be enabled, the function mode control information MODE_INFO may include identification information of the physical function to be enabled among the physical functions 1 to n 620-1 to 620-n. In another example, when one physical function is to be disabled, the function mode control information MODE_INFO may include identification information of the physical function to be disabled among the physical functions 1 to n 620-1 to 620-n. According to an embodiment, the identification information of the physical function may include at least one of a bus number, a device number, and a function number.

According to an embodiment, the physical function 0 610 may receive the function mode control information MODE_INFO from the host 1000 using one of a vendor-defined message, a vendor-defined capability, a new PCIe capability defined by a user, Management Component Transport Protocol (MCTP) over SMbus (System Manager bus), and MCTP over PCIe.

According to an embodiment, the vendor-defined message may allow expansion of PCI Express messaging capabilities. For example, the vendor-defined message may include a requester ID field for sending a message, a receiver ID field for receiving a message, and a vendor-defined field. The receiver ID may include at least one of a bus number, a device number, and a function number. For example, the host 1000 may provide the function mode control information MODE_INFO to the physical function 0 610 through the vendor-defined field of the vendor-defined message. The requester ID may include identification information of the host 1000 or the system image. The receiver ID may receive identification information of the PCIe device 600 or a physical function receiving the message.

According to an embodiment, the vendor-specific capability may be a capability structure of a PCI-compatible Configuration Space. The vendor-specific capability may allow device vendors to use the capability mechanism for vendor-specific information. A vendor-specific capability register may include a capability ID field, a next capability pointer field, a capability length field, and a vendor specific information field. The capability ID field may indicate a PCIe capability structure. The capability ID field may provide a capability ID indicating a vendor-specific capability structure. The next capability pointer field may indicate an offset for the next PCI capability structure. When there is no linked list of capabilities, the next capability pointer field may include 00h. The capability length field may provide the number of bytes included in the capability structure. The vendor specific information field may vary depending on vendors. Therefore, the vendor specific information field may be set to various values depending on a user. For example, the host 1000 may provide the function mode control information MODE_INFO to the physical function 0 610 through the specific information field of the vendor specific capability.

According to an embodiment, the new PCIe capability defined by the user may include identification information of a device which provides information, identification information of device which receives information, and a field which includes information.

According to an embodiment, the physical functions 1 to n 620-1 to 620-n may be enabled or disabled according to an operation mode. For example, the physical functions 1 to n 620-1 to 620-n may be set to one of an active mode or an inactive mode. The physical functions 1 to n 620-1 to 620-n set to the active mode may be enabled to perform operations and may perform communication with assigned system images through the PCIe link. The physical functions 1 to n 620-1 to 620-n set to the inactive mode may be disabled so as not to perform operations and may not perform communication through the PCIe link.

According to an embodiment, the function mode controller 630 may set the operation mode of each of the physical functions 1 to n 620-1 to 620-n to one of the active mode and the inactive mode based on the function mode control information MODE_INFO.

For example, the function mode controller 630 may provide the physical functions 1 to n 620-1 to 620-n with an enable control signal ENABLE based on the function mode control information MODE_INFO. The physical functions 1 to n 620-1 to 620-n that have received the enable control signal ENABLE may be set to the active mode.

According to an embodiment, one or more physical functions 1 to n 620-1 to 620-n set to the active mode may perform a configuration operation. During the configuration operation, information stored in the configuration space of the physical functions 610 and 1 620-1 to n 620-n may be provided to the host 1000, and the configuration space may be set in response to a configuration request from the host 1000. For example, each of the physical functions 1 to n 620-1 to 620-n set to the active mode may receive a configuration request from the host 1000 and may perform the configuration operation in response to the configuration request.

For example, the function mode controller 630 may provide the physical functions 1 to n 620-1 to 620-n with a disable control signal DISABLE based on the function mode control information MODE_INFO. The physical functions 1 to n 620-1 to 620-n that have received the disable control signal DISABLE may be set to the inactive mode.

According to an embodiment, the function mode controller 630 may perform clock gating on one or more second physical functions 620-1 to 620-n that are set to the inactive mode to reduce power consumption of the PCIe device 600.

Accordingly, according to an embodiment, by enabling or disabling the physical functions 1 to n 620-1 to 620-n based on the function mode control information MODE_INFO received from the host 1000 through various communication techniques, the functions may be controlled according to user's intentions and an operation expense of the computing system including the PCIe device 600 may be reduced.

Figure 7:
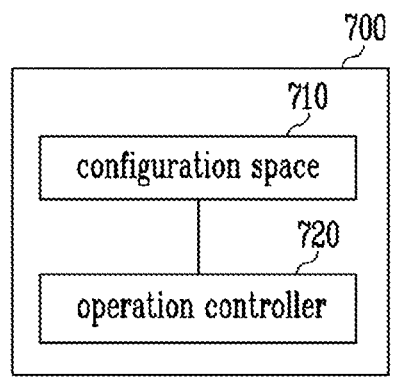
FIG. 7 illustrates a physical function according to an embodiment of the present disclosure.

FIG. 7 illustrates a physical function 700 according to an embodiment of the present disclosure.

The physical function 700 as shown in FIG. 7 may indicate the physical function 0 610 or one of the physical functions 1 to n 620-1 to 620-n shown in FIG. 6.

Referring to FIG. 7, the physical function 700 may include a configuration space 710 and an operation controller 720.

The configuration space 710 may include information for configuring the physical function 700. For example, the configuration space 710 may include registers for configuring the physical function 700 to perform operations associated with a PCIe interface. According to an embodiment, the configuration space 710 may include information on capabilities available in the physical function 700.

According to an embodiment, the physical function 700 may perform a configuration operation in response to a configuration request of the host 1000. The physical function 700 and the host 1000 may perform communication based on the configuration space 710 which is set according to the configuration operation.

The operation controller 720 may control operations of the physical function 700 based on information included in the configuration space 710. For example, the operation controller 720 may control operations of the physical function 700 based on the configuration space 710 set according to the configuration operation. For example, the operation controller 720 may control the operations of the physical function 700 based on field values of the registers set in the configuration space 710.

The physical function 0 610 as shown in FIG. 6 may further include configurations for managing a PCIe link and for managing functionality shared between the physical function 0 610 and the physical functions 1 to n 620-1 to 620-n.

Figure 8A:
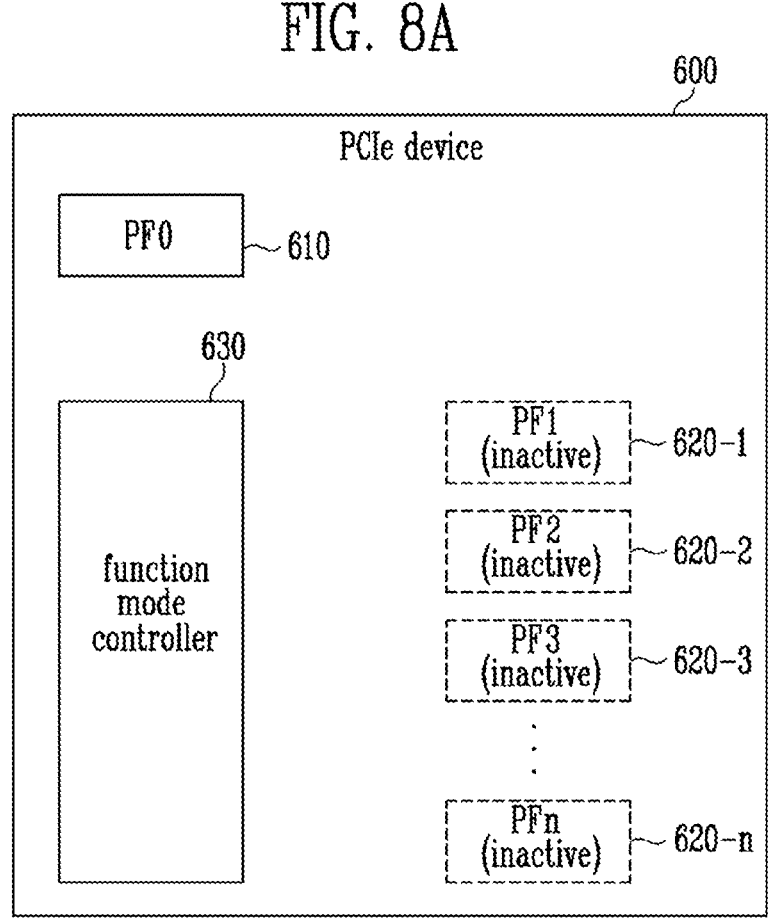
FIG. 8A illustrates a PCIe device in a link up state according to an embodiment of the present disclosure.
Figure 8B:
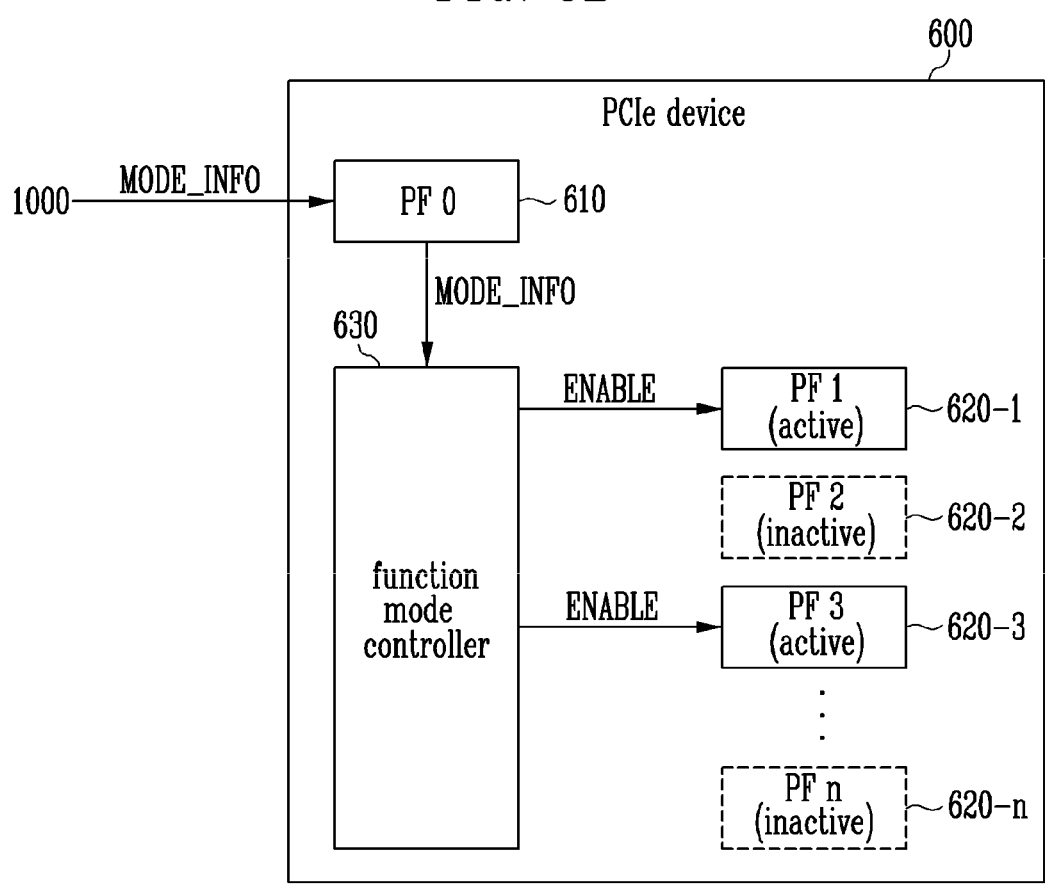
FIG. 8B illustrates setting an operation mode of a physical function to an active mode after a link up according to an embodiment of the present disclosure.
Figure 8C:
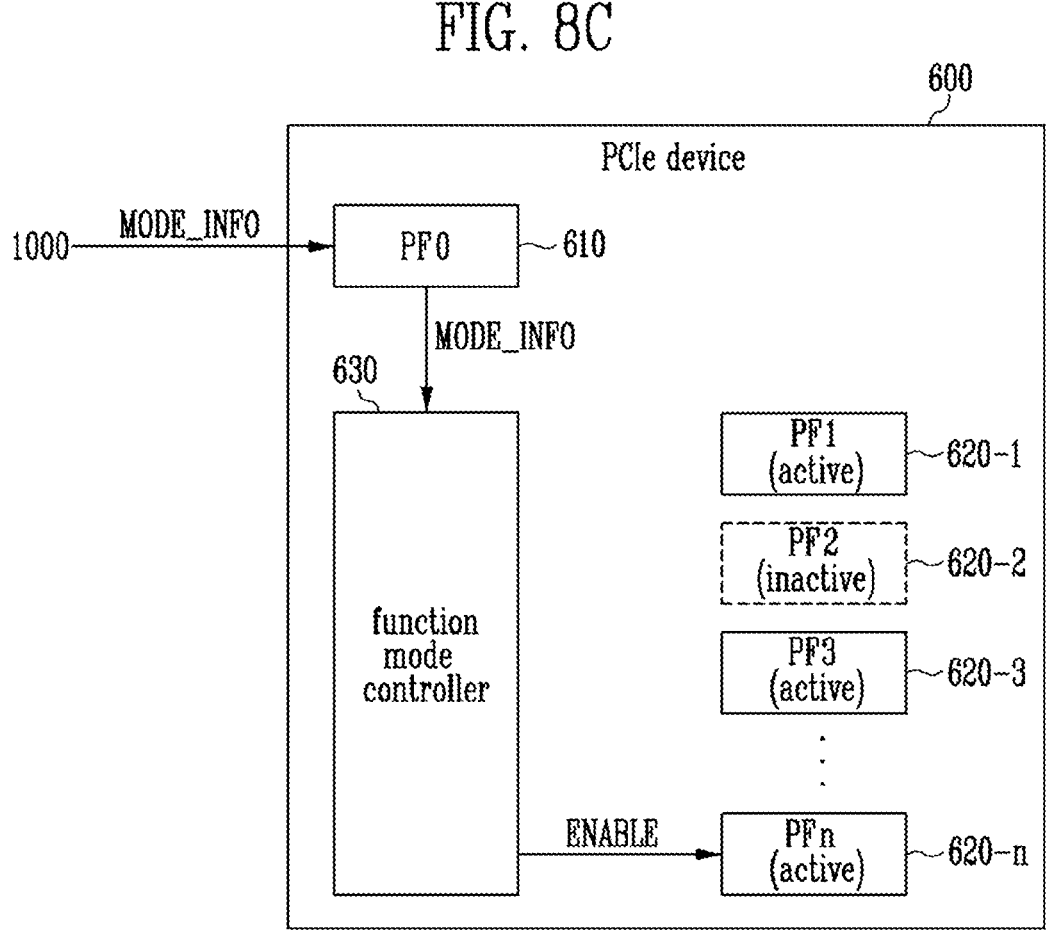
FIG. 8C illustrates setting an operation mode of a physical function to an inactive mode in a general operation state according to an embodiment of the present disclosure.

FIG. 8A illustrates a PCIe device in a link up state according to an embodiment of the present disclosure. FIG. 8B illustrates setting an operation mode of a physical function to an active mode after a link up according to an embodiment of the present disclosure. FIG. 8C illustrates setting an operation mode of a physical function to an inactive mode in a general operation state according to an embodiment of the present disclosure. FIG. 8D illustrates setting an operation mode of a physical function to an active mode in a general operation state according to an embodiment of the present disclosure.

Referring to FIG. 8A, a link up state may refer to a power on of the PCIe device 600 or a state right after initialization of the physical function 0 610 and the physical functions 1 to n 620-1 to 620-n. The PCIe device 600 may perform link initialization and training so as to perform normal packet exchange with the host 1000 through the PCIe link after the link up. The state in which the normal packet exchange is performed may be defined as "L0". The link initialization and training may be performed by Link Training & Status State Machine (LTSSM).

According to an embodiment, the physical functions 1 to n 620-1 to 620-n included in the PCIe device 600 in the link up state may be set to an inactive mode. Therefore, the physical functions 1 to n 620-1 to 620-n may be disabled.

Referring to FIG. 8B, after the link up, the physical function 0 610 may receive the function mode control information MODE_INFO from the host 1000. The physical function 0 610 may provide the function mode control information MODE_INFO to the function mode controller 630.

In the example of FIG. 8B, the function mode control information MODE_INFO includes the number of physical functions to be enabled (in this example, 2) and identification information of the physical function 1 620-1 and the physical function 3 620-3 that are to be enabled. The function mode controller 630 may provide the enable control signal ENABLE to the physical function 1 620-1 and the physical function 3 620-3 based on the function mode control information MODE_INFO. The physical function 1

620-1 and the physical function 3 620-3 may set an operation mode to an active mode. As a result, the physical function 1 620-1 and the physical function 3 620-3 may be enabled.

The enabled physical function 1 620-1 and physical function 3 620-3 may subsequently receive a configuration request from the host 1000. The physical function 1 620-1 and the physical function 3 620-3 may perform a configuration operation in response to the configuration request.

Referring to FIG. 8C, after the link initialization and training is completed and the physical function 0 610 is operating normally, the physical function 0 610 may receive the function mode control information MODE_INFO from the host 1000.

In the example of FIG. 8C, the function mode control information MODE_INFO includes the identification information of the physical function n 620-n that is to be enabled. The function mode controller 630 may provide the physical function n 620-n with the enable control signal ENABLE based on the function mode control information MODE_INFO. The physical function n 620-n may set the operation mode to the active mode in response to the enable control signal ENABLE. As a result, the physical function n 620-n may be enabled.

The enabled physical function n 620-n may subsequently receive a configuration request from the host 1000. The physical function n 620-n may perform a configuration operation in response to the configuration request.

Referring to FIG. 8D, after the link initialization and training is completed and the physical function 0 610 operates normally, the physical function 0 610 may receive the function mode control information MODE_INFO from the host 1000.

In the example of FIG. 8D, the function mode control information MODE_INFO includes identification information of the physical function 3 620-3 that is to be disabled. The function mode controller 630 may provide the physical function 3 620-3 with the disable control signal DISABLE based on the function mode control information MODE_INFO. The physical function 3 620-3 may set the operation mode to the inactive mode in response to the disable control signal DISABLE. As a result, the physical function 3 620-3 may be disabled.

The function mode controller 630 may perform clock gating on the disabled physical function 3 620-3.

Figure 9:
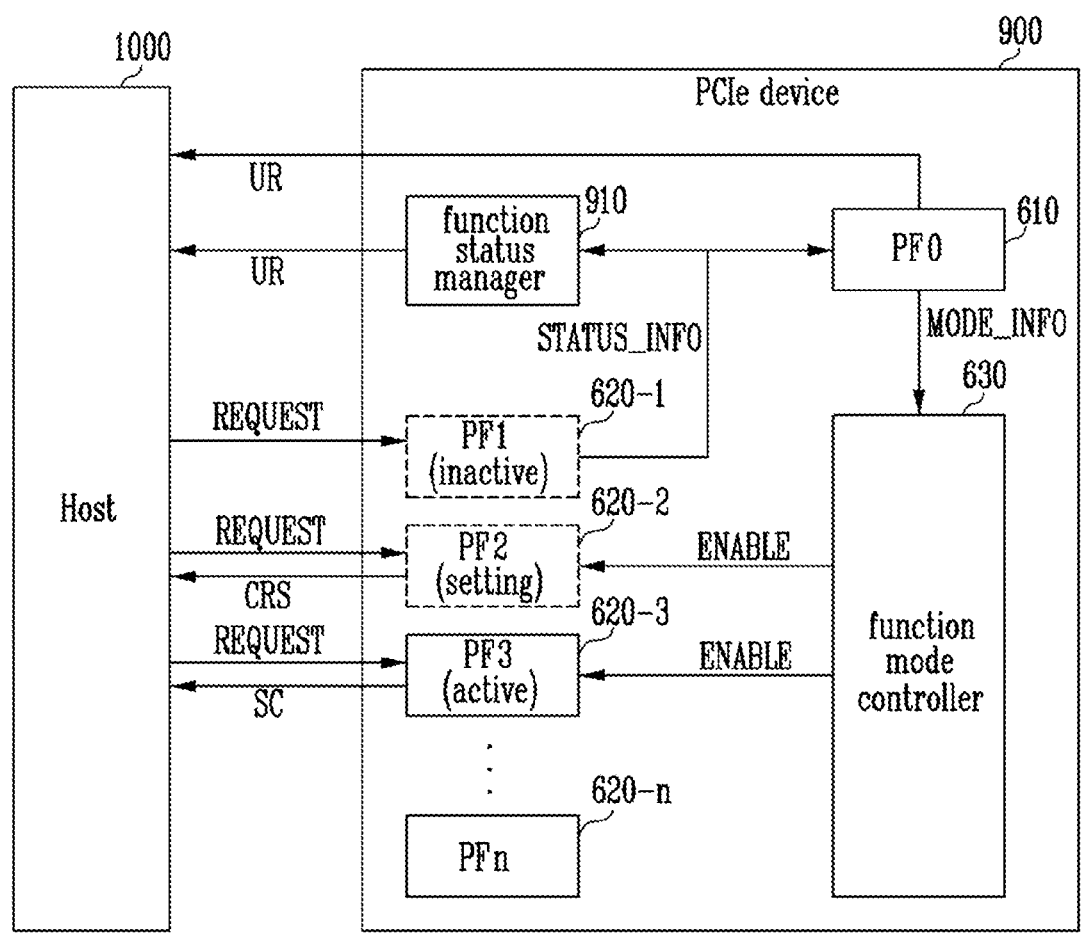
FIG. 9 illustrates a PCIe device according to another embodiment of the present disclosure.

FIG. 9 illustrates a PCIe device 900 according to another embodiment of the present disclosure.

The PCIe device 900 may further include a function status manager 910. Descriptions of the physical function 0 610, the physical functions 1 to n 620-1 to 620-n and the function mode controller 630 of the PCIe device 900 will be omitted since they are the same as the corresponding features of PCIe device 600 shown in FIG. 6.

According to an embodiment, the function status manager 910 may store status information STATUS_INFO of each of one or more second physical functions set to an inactive mode among the physical functions 1 to n 620-1 to 620-n. For example, the disabled physical function 1 620-1 may provide the function status manager 910 and the physical function 0 610 with the status information STATUS_INFO indicating an inactive status. The function status manager 910 and the physical function 0 610 may store identification information of the physical function 1 620-1 and the status information STATUS_INFO of the physical function 1 620-1.

According to an embodiment, the physical function 0 610 and the physical functions 1 to n 620-1 to 620-n may provide completion information in response to a request REQUEST of the host 1000. The completion information may include information indicating the current status of the physical functions 610 and 620-1 to 620-n. For example, the completion information may include a completion header including a completion status field. The completion status field may include one of Successful Completion (SC) information, Unsupported Request (UR) information, Configuration Request Retry Status (CRS) information, and Completer Abort (CA) information. For example, the physical function 0 610 and the physical functions 1 to n 620-1 to 620-n may return the completion information corresponding to the current status in response to the request REQUEST of the host 1000.

According to an embodiment, the request REQUEST of the host 1000 may include a configuration request.

In an embodiment, when the PCIe device 900 receives the request REQUEST for a physical function set to the inactive mode from the host 1000, the physical function 0 610 may provide the host 1000 with the UR information.

In another embodiment, when receiving the request REQUEST for a physical function set to the inactive mode from the host 1000, the function status manager 910 may provide the host 1000 with the UR information.

For example, the host 1000 may send the request REQUEST to the disabled physical function 1 620-1. In response, the physical function 0 610 or the function status manager 910 may provide the host 1000 with the UR information. The host 1000 having received the UR information may perceive that the physical function 1 620-1 is disabled.

According to an embodiment, when the host 1000 sends the request REQUEST to a second physical function of the physical functions 1 to n 620-1 to 620-n that is in the process of being set to an active mode or an inactive mode, the second physical function may provide CRS information to the host 1000. For example, FIG. 9 shows that the physical function 2 620-2 is being set to the active mode in response to the enable control signal ENABLE. Accordingly, in response to receiving the request REQUEST from the host 1000, the physical function 2 620-2 may provide the host 1000 with the CRS information. The host 1000 having received the CRS information may perceive that the physical function 2 620-2 is being set.

In the above example, CRS information may be provided when the request is received while a physical function is being set to an active mode. However, the CRS information providing operation may also be applicable to a case in which a request is received while a physical function is being set to an inactive mode.

According to an embodiment, when one or more physical functions among the physical functions 1 to n 620-1 to 620-n are set to the active mode and then receive a request from the host 1000, the physical functions may provide the host 1000 with the SC information. For example, FIG. 9 shows that the physical function 3 630-3 is set to the active mode in response to the enable control signal ENABLE. When receiving the request REQUEST from the host 1000, the physical function 3 620-3 may provide the host 1000 with the SC information. The host 1000 having received the SC information may perceive that the physical function 3 620-3 is enabled.

FIG. 10 illustrates a process for operating the PCIe device 600 according to an embodiment of the present disclosure.

The process as shown in FIG. 10 may be performed by, for example, the PCIe device 600 as shown in FIG. 6 or the PCIe device 900 as shown in FIG. 9. Hereinafter, the operating process of the PCIe 600 as shown in FIG. 6 will be described. However, the operating process may also be performed by the PCIe device 900 as shown in FIG. 9. In FIG. 10, the first physical function may indicate the physical function 0 610 as described above with reference to FIG. 6 or FIG. 9. In FIG. 10, the second physical function may indicate one of the physical functions 1 to n 620-1 to 620-n as described above with reference to FIG. 6 or FIG. 9.

Referring to FIG. 10, at step S1001, the PCIe device 600 may receive function mode control information from the host 1000 through a first physical function.

The first physical function may receive the function mode control information from the host 1000 by using one of a vendor-defined message, a vendor-defined capability, a new PCIe capability defined by a user, Management Component Transport Protocol (MCTP) over SMbus (System Manager bus), and MCTP over PCIe.

At step S1003, the PCIe device 600 may set an operation mode of each of the second physical functions to one of an active mode and an inactive mode based on the function mode control information.

FIG. 11 illustrates a process for providing PCIe device completion information according to an embodiment of the present disclosure.

The process as shown in FIG. 11 may be performed by, for example, the PCIe device 900 as shown in FIG. 9. In FIG. 11, a first physical function may indicate the physical function 0 610 described above with reference to FIG. 6 or FIG. 9. In FIG. 11, a second physical function may indicate one of the physical functions 1 to n 620-1 to 620-n as described above with reference to FIG. 6 or FIG. 9.

Referring to FIG. 11, at step S1101, the PCIe device 900 may receive a request intended for the second physical function from the host 1000.

At step S1103, the PCIe device 900 may determine whether the second physical function for which the request is intended is set to an inactive mode or not.

According to a result of the determination at step S1103, when the second physical function is set to the inactive mode, the PCIe device 900 may provide the host 1000 with UR information at step S1105.

According to the result of the determination at step S1103, when the second physical function is not set to the inactive mode, the PCIe device 900 may perform step S1107.

At step S1107, the PCIe device 900 may determine whether the second physical function for which the request is intended is set to an active mode or not.

According to a result of determination at step S1107, when the second physical function is set to the active mode, the PCIe device 900 may provide the host 1000 with SC information at step S1109.

According to the result of determination at step S1107, when the second physical function is not set to the active mode, the PCIe device 900 may provide the host 1000 with CRS information at step S1111.

For example, when the PCIe device 900 receives a request from the host 1000 while the second physical function is being set to the active mode or is being set to the inactive mode, the PCIe device 900 may provide the host 1000 with the CRS information at step S1111.

Figure 12:
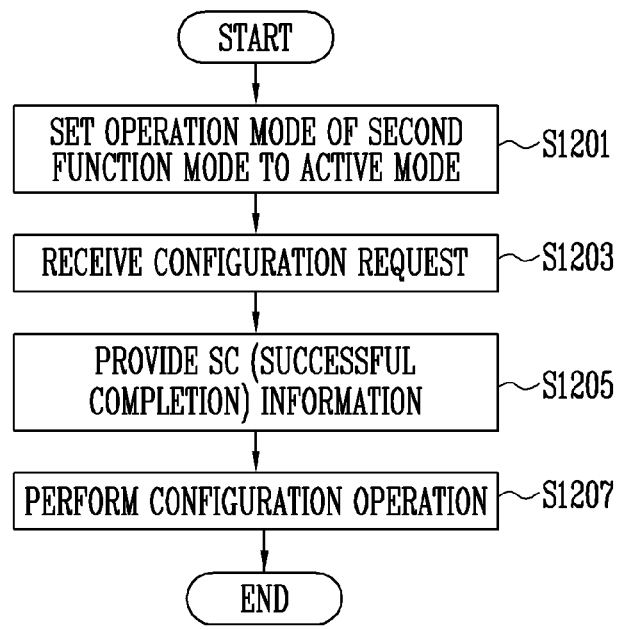
FIG. 12 illustrates a process for controlling a physical function set to an active mode according to an embodiment of the present disclosure.

FIG. 12 illustrates a process for controlling a physical function set to an active mode according to an embodiment of the present disclosure.

The process as shown in FIG. 12 may be performed by, for example, the PCIe device 600 as shown in FIG. 6 or the PCIe device 900 as shown in FIG. 9. Hereinafter, the operating process of the PCIe device 600 as shown in FIG. 6 will be described. However, the operating process may also be performed by the PCIe device 900 as shown in FIG. 9. In FIG. 12, a first physical function may indicate the physical function 0 610 described above with reference to FIG. 6 or FIG. 9. In FIG. 12, a second physical function may indicate one of the physical functions 1 to n 620-1 to 620-n as described above with reference to FIG. 6 or FIG. 9.

Referring to FIG. 12, at step S1201, the PCIe device 600 may set an operation mode of the second physical function to an active mode based on the function mode control information.

At step S1203, the PCIe device 600 may receive a configuration request for the second physical function which is set to the active mode from the host 1000.

At step S1205, the PCIe device 600 may provide the host 1000 with SC information.

Steps S1203 and S1205 may correspond to steps S1101, S1107 and S1109 as described with reference to FIG. 11.

At step S1207, the PCIe device 600 may perform a configuration operation on the second physical function set to the active mode.

The PCIe device 600 may provide the host 1000 with information included in the configuration space of the second physical function set to the active mode. In addition, the PCIe device 600 may set the configuration space of the second physical function in response to the configuration request.

Figure 13:
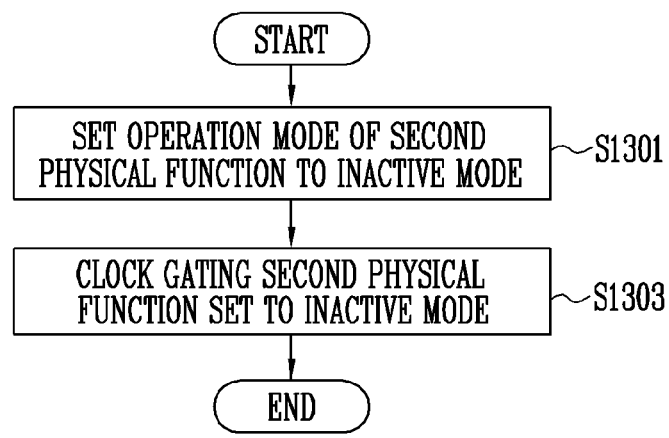
FIG. 13 illustrates a process for controlling a physical function set to an inactive mode according to an embodiment of the present disclosure.

FIG. 13 illustrates a process for controlling a physical function set to an inactive mode according to an embodiment of the present disclosure.

The process as shown in FIG. 13 may be performed by, for example, the PCIe device 600 as shown in FIG. 6 or the PCIe device 900 as shown in FIG. 9. Hereinafter, the operating process of the PCIe 600 as shown in FIG. 6 will be described.

However, the operating process may also be performed by the PCIe device 900 as shown in FIG. 9. In FIG. 13, a first physical function may indicate the physical function 0 610 described above with reference to FIG. 6 or FIG. 9. In FIG. 13, a second physical function may indicate one of the physical functions 1 to n 620-1 to 620-n as described above with reference to FIG. 6 or FIG. 9.

Referring to FIG. 13, at step S1301, the PCIe device 600 may set an operation mode of the second physical function to an inactive mode based on the function mode control information.

At step S1303, the PCIe device 600 may perform clock gating on the second physical function set to the inactive mode. Performing clock gating on the second physical function may reduce the power consumption of the PCIe device 600.

According to the present disclosure, a PCIe device capable of reducing operation cost of a computing system including the PCIe device, and an operating method thereof may be provided.

In addition, according to the present disclosure, a PCIe device that enables or disables a PCIe function according to user's intentions, and an operating method thereof may be provided.

While the embodiments of the present disclosure have been disclosed for illustrative purposes, those skilled in the art will appreciate that various modifications, additions and substitutions are possible. Thus, it is intended that the present invention cover all such modifications provided they come within the scope of the appended claims and their equivalents.

What is claimed is:

1. A Peripheral Component Interconnect Express (PCIe) device, the PCIe device comprising:
a first physical function managing a PCIe link and receiving function mode control information from a host;
a plurality of second physical functions assigned to a plurality of system images and respectively enabled or disabled according to respective operation modes; and
a function mode controller setting the operation modes of the plurality of second physical functions based on the function mode control information, each of the operation modes being set to one of an active mode and an inactive mode,
wherein one or more second physical functions set to the active mode, among the plurality of second physical functions, perform a configuration operation in which configuration spaces respectively corresponding to the one or more second physical functions are set, and provides physical resources of the PCIe device to one or more system images assigned to the one or more second physical functions among the plurality of system images, and
wherein remaining second physical functions set to the inactive mode, among the plurality of second physical functions, stop providing the physical resources to remaining system images assigned to the remaining second physical functions among the plurality of system images according to clock gating.

2. The PCIe device of claim 1, wherein the function mode control information includes at least one of a number of second physical functions to be enabled among the plurality of second physical functions, identification information of the second physical functions to be enabled, a number of second physical functions to be disabled among the plurality of second physical functions, and identification information of the second physical functions to be disabled.

3. The PCIe device of claim 1, wherein the first physical function receives the function mode control information using one of a vendor-defined message, a vendor-defined capability, a new PCIe capability defined by a user, Management Component Transport Protocol (MCTP) over SMbus (System Manager bus), and MCTP over PCIe.

4. The PCIe device of claim 1, wherein the first physical function provides the host with unsupported request (UR) information when the PCIe device receives from the host a request intended for a second physical function of the plurality of second physical functions and the second physical function is set to the inactive mode.

5. The PCIe device of claim 1, further comprising a function status manager storing information related to a second physical function among the plurality of second physical functions when the second physical function is set to the inactive mode.

6. The PCIe device of claim 5, wherein the function status manager provides the host with unsupported request (UR) information when the PCIe device receives from the host a request for the second physical function and the second physical function is set to the inactive mode.

7. The PCIe device of claim 1, wherein a second physical function among the plurality of second physical functions provides the host with Configuration Request Retry Status (CRS) information when the second physical function receives a request from the host while the second physical functions is in a process of being set to the active mode or is in a process of being set to the inactive mode.

8. The PCIe device of claim 1, wherein a second physical function among the plurality of second physical functions provides the host with successful completion (SC) information when the second physical function receives a request from the host and the second physical function is set to the active mode.

9. The PCIe device of claim 1, wherein
each of the configuration spaces include information for configuring a corresponding second physical function; and
the one or more second physical functions operate based on the information included in the configuration spaces.

10. The PCIe device of claim 9, wherein the one or more second physical functions provide the host with the information included in the configuration spaces.

11. A method of operating a Peripheral Component Interconnect Express (PCIe) device including a first physical function and a plurality of second physical functions, the first physical function managing a PCIe link coupled to a host, the method comprising:
receiving function mode control information from the host through the first physical function;
setting an operation mode of each of the plurality of second physical functions based on the function mode control information, each operation mode being respectively set to one of an active mode and an inactive mode;
performing a configuration operation in which configuration spaces respectively corresponding to one or more second physical functions set to the active mode, among the plurality of second physical functions, are set to provide physical resources of the PCIe device to one or more system images assigned to the one or more second physical functions; and
clock gating remaining second physical functions set to the inactive mode, among the plurality of second physical functions, to stop providing the physical resources to system images assigned to the remaining second physical functions.

12. The method of claim 11, wherein the function mode control information includes at least one of a number of second physical functions to be enabled among the plurality of second physical functions, identification information of the second physical functions to be enabled, a number of second physical functions to be disabled among the plurality of second physical functions, and identification information of the second physical functions to be disabled.

13. The method of claim 11, wherein receiving the function mode control information comprises receiving the function mode control information using one of a vendor-defined message, a vendor-defined capability, a new PCIe capability defined by a user, Management Component Transport Protocol (MCTP) over SMbus (System Manager bus), and MCTP over PCIe.

14. The method of claim 11, further comprising providing the host with Unsupported Request (UR) information in response to receiving from the host a request intended for a second physical function set to the inactive mode among the plurality of second physical functions.

15. The method of claim 11, further comprising providing the host with Configuration Request Retry Status (CRS) information in response to receiving from the host a request intended for a second physical function among the plurality of second physical functions while the second physical function is being set to the active mode or the inactive mode.

16. The method of claim 11, further comprising providing the host with Successful Completion (SC) information in response to receiving from the host a request intended for a second physical function set to the active mode among the plurality of second physical functions.

17. The method of claim 11, wherein the configuration operation is performed in response to receiving from the host a configuration request intended for a second physical function.

18. The method of claim 11, wherein performing the configuration operation further comprises:
   providing the host with information included in the configuration space of the second physical function.

* * * * *

UNITED STATES PATENT AND TRADEMARK OFFICE
CERTIFICATE OF CORRECTION

PATENT NO. : 11,983,136 B2  
APPLICATION NO. : 17/504884  
DATED : May 14, 2024  
INVENTOR(S) : Yong Tae Jeon, Sang Hyun Yoon and Se Hyeon Han Page 1 of 1

It is certified that error appears in the above-identified patent and that said Letters Patent is hereby corrected as shown below:

On the Title Page

Column 1, item (71), Applicants section, cancel the text "YongTae Jeon, Icheon(KR); Sang Hyun Yoon, Icheon (KR); Se Hyeon Han, Icheon(KR)" and insert --SK Hynix Inc., Icheon(KR)--.

Signed and Sealed this  
Ninth Day of July, 2024

Katherine Kelly Vidal  
*Director of the United States Patent and Trademark Office*